(12) United States Patent
Urushihara et al.

(10) Patent No.: US 11,477,402 B2
(45) Date of Patent: Oct. 18, 2022

(54) SOLID-STATE IMAGE SENSOR WITH IMPROVED DARK CURRENT REMOVAL

(71) Applicant: SONY SEMICONDUCTOR SOLUTIONS CORPORATION, Kanagawa (JP)

(72) Inventors: Minoru Urushihara, Kanagawa (JP); Tomohiro Sekiguchi, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 17/045,486

(22) PCT Filed: Feb. 6, 2019

(86) PCT No.: PCT/JP2019/004138
§ 371 (c)(1),
(2) Date: Oct. 5, 2020

(87) PCT Pub. No.: WO2019/198319
PCT Pub. Date: Oct. 17, 2019

(65) Prior Publication Data
US 2021/0029314 A1    Jan. 28, 2021

(30) Foreign Application Priority Data
Apr. 13, 2018   (JP) .............................. JP2018-077220

(51) Int. Cl.
*H04N 5/361* (2011.01)
*H04N 5/369* (2011.01)
(Continued)

(52) U.S. Cl.
CPC ........... *H04N 5/361* (2013.01); *H04N 5/3698* (2013.01); *H04N 5/36963* (2018.08);
(Continued)

(58) Field of Classification Search
CPC .. H04N 5/361; H04N 5/3696; H04N 5/36963; H04N 5/3698; H04N 5/376
See application file for complete search history.

(56) References Cited

U.S. PATENT DOCUMENTS

2004/0233310 A1* 11/2004 Egawa ................. H04N 5/3658
348/301
2008/0258047 A1* 10/2008 Sakakibara ............... G01J 1/44
250/214 C
(Continued)

FOREIGN PATENT DOCUMENTS

CN    101674399 A    3/2010
JP    2000-295533 A    10/2000
(Continued)

OTHER PUBLICATIONS

International Search Report and Written Opinion of PCT Application No. PCT/JP2019/004138, dated May 14, 2019, 09 pages of ISRWO.

*Primary Examiner* — Paul M Berardesca
(74) *Attorney, Agent, or Firm* — Chip Law Group

(57) ABSTRACT

To improve the correction accuracy in a solid-state image sensor that performs dark current correction. A solid-state image sensor includes a bias voltage supply unit and a signal processing unit. The bias voltage supply unit supplies a bias voltage of a predetermined value to a light-shielded pixel impervious to light in a period in which a light-shielded pixel signal is output from the light-shielded pixel, and supplies a bias voltage of a value different from the predetermined value to a photosensitive pixel not impervious to light in a period in which a photosensitive pixel signal is output from the photosensitive pixel. The signal processing unit executes processing of removing dark current noise from the photosensitive pixel signal using the light-shielded pixel signal.

13 Claims, 26 Drawing Sheets

(51) Int. Cl.
 *H04N 5/374* (2011.01)
 *H04N 5/376* (2011.01)
(52) U.S. Cl.
 CPC ............. *H04N 5/374* (2013.01); *H04N 5/379* (2018.08); *H04N 5/376* (2013.01)

(56) References Cited

U.S. PATENT DOCUMENTS

| | | |
|---|---|---|
| 2010/0060768 A1 | 3/2010 | Ukita et al. |
| 2015/0304578 A1* | 10/2015 | Okura .................... H04N 5/374 348/308 |
| 2017/0054926 A1* | 2/2017 | Kikuchi .............. H03F 3/45475 |
| 2018/0146154 A1* | 5/2018 | Sato ....................... H04N 5/351 |
| 2019/0191112 A1* | 6/2019 | Shigiya .............. H04N 5/37452 |

FOREIGN PATENT DOCUMENTS

| | | |
|---|---|---|
| JP | 2010-068056 A | 3/2010 |
| JP | 2010-114487 A | 5/2010 |
| JP | 2014-207631 A | 10/2014 |

* cited by examiner

SOLID-STATE IMAGE SENSOR WITH IMPROVED DARK CURRENT REMOVAL

CROSS REFERENCE TO RELATED APPLICATIONS

This application is a U.S. National Phase of International Patent Application No. PCT/JP2019/002642 filed on Jan. 28, 2019, which claims priority benefit of Japanese Patent Application No. JP 2018-077088 filed in the Japan Patent Office on Apr. 12, 2018. Each of the above-referenced applications is hereby incorporated herein by reference in its entirety.

TECHNICAL FIELD

The present technology relates to a solid-state image sensor, an imaging apparatus, and a method of controlling the solid-state image sensor. Specifically, the present technology relates to a solid-state image sensor in which a light-shielded region is disposed, an imaging apparatus, and a method of controlling the solid-state image sensor.

BACKGROUND ART

A solid-state image sensor has conventionally been used to capture image data by an imaging apparatus or the like. It is known that a dark current is generated in a pixel in the solid-state image sensor even in a state where no light is incident thereto. The amount of this dark current depends on time, temperature, and bias voltage, and the dark current causes noise in image data. Thus, in order to remove the noise caused by the dark current, a solid-state image sensor has been proposed in which a horizontal light-shielded region and a vertical light-shielded region impervious to light are disposed around a photosensitive region that is not impervious to light (for example, see Patent Document 1).

CITATION LIST

Patent Document

Patent Document 1: Japanese Patent Application Laid-Open No. 2014-207631

SUMMARY OF THE INVENTION

Problems to be Solved by the Invention

The conventional technique described above can perform dark current correction that removes the noise caused by the dark current from the image data by using a signal from each of the horizontal light-shielded region and the vertical light-shielded region. However, it is difficult to improve the correction accuracy of this dark current correction. An increase in the number of pixels in the light-shielded region increases the number of signals from light-shielded pixels to be able to improve the correction accuracy, which however decreases a relative area of the photosensitive region in the solid-state image sensor and is not preferable.

The present technology has been made in view of such circumstances, and an object thereof is to improve the correction accuracy in a solid-state image sensor that performs dark current correction.

Solutions to Problems

The present technology has been made in order to solve the above problems, and a first aspect thereof is a solid-state image sensor and a method of controlling the solid-state image sensor, the solid-state image sensor including: a bias voltage supply unit that supplies a bias voltage of a predetermined value to a light-shielded pixel impervious to light in a period in which a light-shielded pixel signal is output from the light-shielded pixel, and supplies a bias voltage of a value different from the predetermined value to a photosensitive pixel not impervious to light in a period in which a photosensitive pixel signal is output from the photosensitive pixel; and a signal processing unit that executes processing of removing dark current noise from the photosensitive pixel signal using the light-shielded pixel signal. This brings about an effect that dark currents having different rates of increase are generated in the light-shielded pixel and the photosensitive pixel.

Moreover, in the first aspect, the bias voltage supply unit may supply the bias voltage of the predetermined value to both the light-shielded pixel and the photosensitive pixel in the period in which the light-shielded pixel signal is output, and supply the bias voltage different from the predetermined value to both the light-shielded pixel and the photosensitive pixel in the period in which the photosensitive pixel signal is output. This brings about an effect that dark currents having different rates of increase are generated in the period in which the light-shielded pixel signal is output and in the period in which the photosensitive pixel signal is output.

Moreover, in the first aspect, the bias voltage supply unit may supply the bias voltages different from each other to corresponding ones of the photosensitive pixel and the light-shielded pixel both in the period in which the light-shielded pixel signal is output and in the period in which the photosensitive pixel signal is output. This brings about an effect that dark currents having different rates of increase are generated in the light-shielded pixel and the photosensitive pixel regardless of the period.

Moreover, the first aspect may further include an address control unit that sequentially selects a row address assigned to each of a plurality of photosensitive rows each including the photosensitive pixels arranged along a predetermined direction, in which the light-shielded pixel may be arranged in each of a vertical light-shielded region in which a row address different from that of the photosensitive row is assigned and a horizontal light-shielded region in which the row address identical to that of the photosensitive row is assigned. This brings about an effect that a dark current is corrected by the light-shielded pixel signals in both the vertical light-shielded region and the horizontal light-shielded region.

Moreover, in the first aspect, the signal processing unit may simultaneously control an exposure start timing and an exposure end timing for all of the light-shielded pixel and the photosensitive pixel. This brings about an effect that a different dark current is generated for each row.

Moreover, the first aspect may further include the address control unit that sequentially selects the row address assigned to each of the plurality of photosensitive rows each including the photosensitive pixels arranged along the predetermined direction, in which the light-shielded pixel may be arranged in each of a first vertical light-shielded region in which a row address different from that of the photosensitive row is assigned and a second vertical light-shielded region in which a row address different from that of each of the photosensitive row and the first vertical light-shielded region is assigned. This brings about an effect that a dark current is corrected by the light-shielded pixel signal in each of the first and second vertical light-shielded regions.

Moreover, in the first aspect, the light-shielded pixel and the photosensitive pixel may be disposed on a predetermined substrate, and the signal processing unit may be disposed on a substrate laminated to the predetermined substrate. This brings about an effect that the bias voltage is supplied to the pixels on the substrate laminated to the substrate on which the signal processing unit is disposed.

Moreover, in the first aspect, the signal processing unit may include: a correction coefficient acquisition unit that acquires a correction coefficient representing a rate of increase of the dark current noise on the basis of the bias voltage and the light-shielded pixel signal; and a dark current correction unit that removes the dark current noise from the photosensitive pixel signal using the correction coefficient. This brings about an effect that dark current correction using the correction coefficient is executed.

Moreover, in the first aspect, the light-shielded pixel and the photosensitive pixel may each include a photoelectric conversion unit that performs photoelectric conversion. This brings about an effect that the bias voltage is supplied to the pixel provided with the photoelectric conversion unit.

Moreover, in the first aspect, the photoelectric conversion unit may be a single element semiconductor device. This brings about an effect that the bias voltage is supplied to the single element semiconductor device.

Moreover, in the first aspect, the photoelectric conversion unit may be a compound semiconductor device. This brings about an effect that the bias voltage is supplied to the compound semiconductor device.

Furthermore, a second aspect of the present technology is an imaging apparatus including: a bias voltage supply unit that supplies a bias voltage of a predetermined value to a light-shielded pixel impervious to light in a period in which a light-shielded pixel signal is output from the light-shielded pixel, and supplies a bias voltage of a value different from the predetermined value to a photosensitive pixel not impervious to light in a period in which a photosensitive pixel signal is output from the photosensitive pixel; a signal processing unit that executes processing of removing dark current noise from the photosensitive pixel signal using the light-shielded pixel signal; and a storage unit that stores image data including the photosensitive pixel signal from which the dark current noise is removed. This brings about an effect that dark currents having different rates of increase are generated in the light-shielded pixel and the photosensitive pixel, and that the dark current noise is removed.

Effects of the Invention

The present technology can achieve a beneficial effect that the solid-state image sensor performing dark current correction can improve the correction accuracy. Note that the present technology may have an effect not necessarily limited to the ones described herein but any effect described in the present disclosure.

MODES FOR CARRYING OUT THE INVENTION

Modes for carrying out the present technology (hereinafter referred to as embodiments) will be described below. The description will be given in the following order.

1. First embodiment (an example in which different bias voltages are supplied in a read period of light-shielded pixels and a read period of photosensitive pixels)
2. Second embodiment (an example in which different bias voltages are supplied to a light-shielded region and a photosensitive region)
3. Third embodiment (an example in which different bias voltages are supplied to horizontal/vertical light-shielded regions and a photosensitive region)
4. Example of application to mobile body

1. First Embodiment

[Example of Configuration of Imaging Apparatus]

Figure 1:
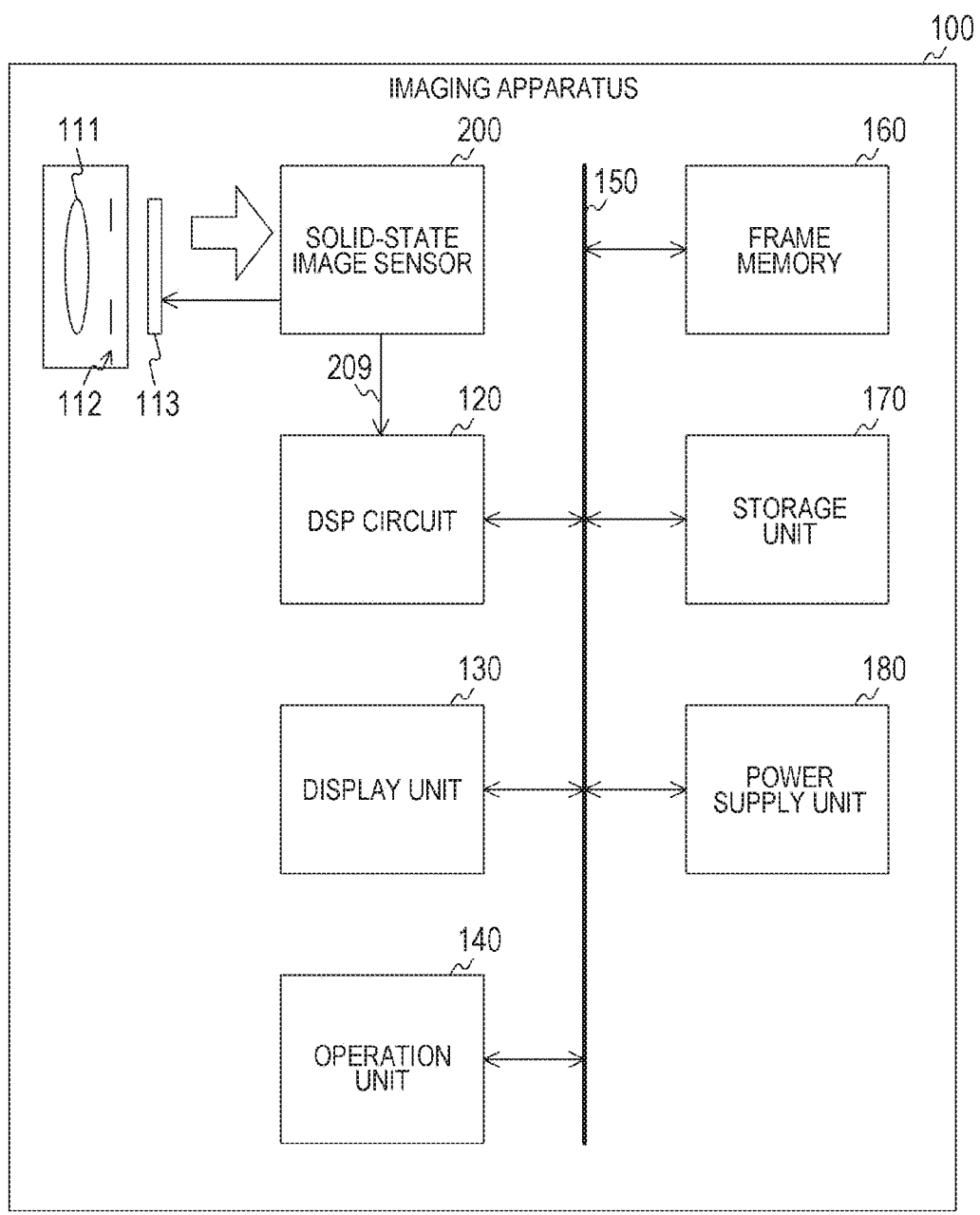
FIG. 1 is a block diagram illustrating an example of a configuration of an imaging apparatus according to a first embodiment of the present technology.

FIG. 1 is a block diagram illustrating an example of a configuration of an imaging apparatus 100 according to a first embodiment of the present technology. The imaging apparatus 100 includes a solid-state image sensor 200, a digital signal processing (DSP) circuit 120, a display unit 130, an operation unit 140, a bus 150, a frame memory 160, a storage unit 170, and a power supply unit 180. The imaging apparatus 100 further includes an imaging lens 111, a diaphragm 112, and a mechanical shutter 113. The imaging apparatus 100 can be a smartphone, an in-vehicle camera, a digital camera, or the like.

The imaging lens 111 collects light from a subject and guides it to the solid-state image sensor 200. The diaphragm 112 is a member that adjusts the amount of light passing therethrough. The mechanical shutter 113 is a shielding member that physically blocks light from the subject. An opening/closing operation of the mechanical shutter 113 is controlled by a control signal from the solid-state image sensor 200.

The solid-state image sensor 200 captures image data. The solid-state image sensor 200 supplies the image data captured to the DSP circuit 120 via a signal line 209.

The DSP circuit 120 executes predetermined signal processing on the image data from the solid-state image sensor 200. The DSP circuit 120 outputs the image data after the processing to the frame memory 160 or the like via the bus 150.

The display unit 130 displays the image data. The display unit 130 can be, for example, a liquid crystal panel or an organic electro luminescence (EL) panel. The operation unit 140 generates an operation signal according to a user's operation.

The bus 150 is a common path for the solid-state image sensor 200, the DSP circuit 120, the display unit 130, the operation unit 140, the frame memory 160, the storage unit 170, and the power supply unit 180 to exchange data with one another.

The frame memory 160 holds the image data. The storage unit 170 stores various data such as the image data. The power supply unit 180 supplies power to the solid-state image sensor 200, the DSP circuit 120, the display unit 130, and the like.

[Example of Configuration of Solid-State Image Sensor]

Figure 2:
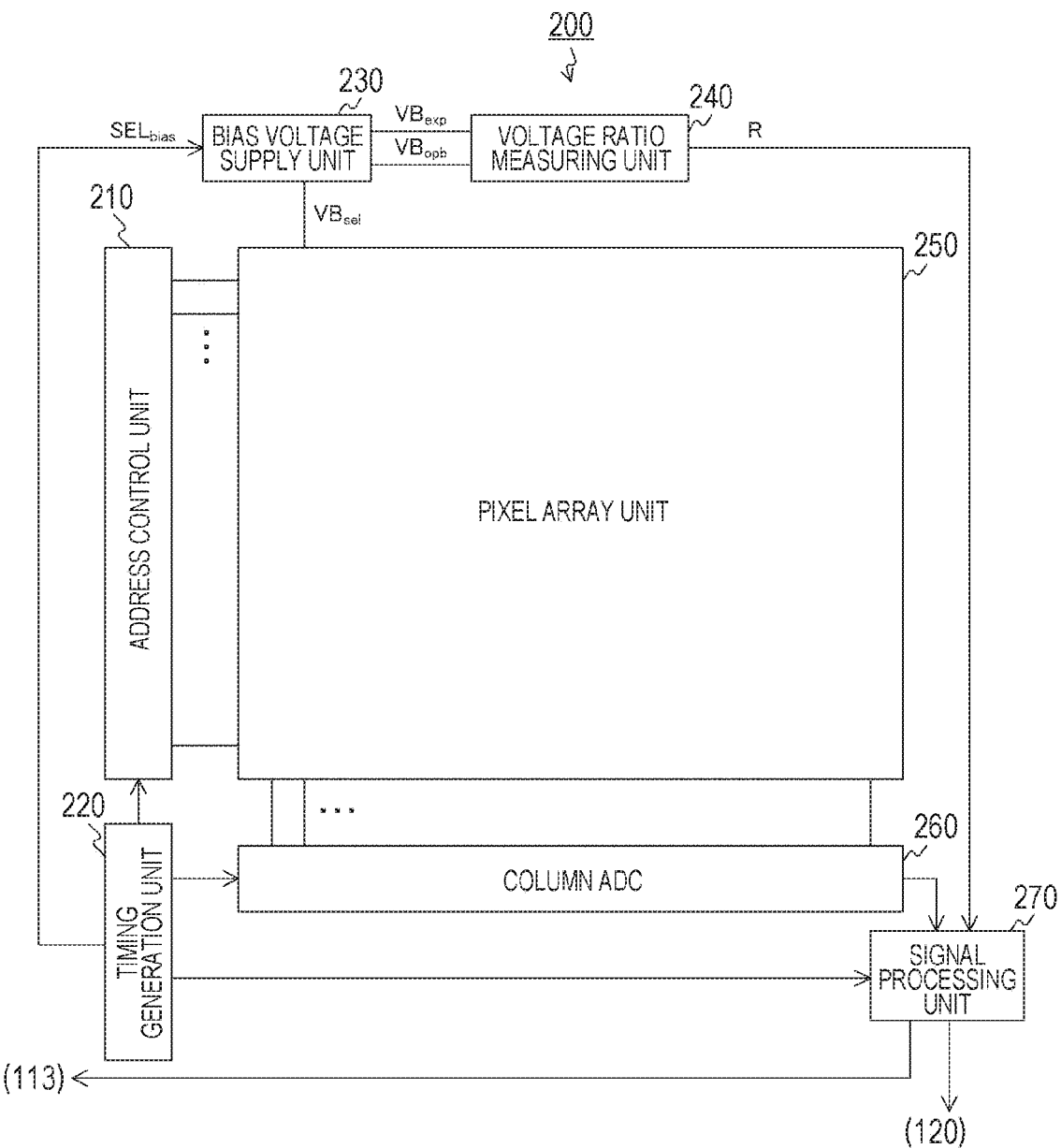
FIG. 2 is a block diagram illustrating an example of a configuration of a solid-state image sensor according to the first embodiment of the present technology.

FIG. 2 is a block diagram illustrating an example of a configuration of the solid-state image sensor 200 according to the first embodiment of the present technology. The solid-state image sensor 200 includes an address control unit 210, a timing generation unit 220, a pixel array unit 250, a column analog-to-digital converter (ADC) 260, and a signal processing unit 270. The solid-state image sensor 200 further includes a bias voltage supply unit 230 and a voltage ratio measuring unit 240.

The timing generation unit 220 generates a signal for controlling an operation timing of each of the address control unit 210, the bias voltage supply unit 230, the column ADC 260, and the signal processing unit 270, and supplies the signal to each unit.

The pixel array unit 250 includes an arrangement of a plurality of pixels. Hereinafter, a group of pixels arranged in a predetermined horizontal direction is referred to as a "row", and a group of pixels arranged in a direction perpendicular to the row is referred to as a "column". Individual rows are assigned row addresses different from each other, and individual columns are assigned column addresses different from each other.

The address control unit 210 sequentially selects the row address and outputs an analog pixel signal to the row corresponding to that row address. The column ADC 260 performs analog-to-digital (AD) conversion on the pixel signal for each column and supplies the signal to the signal processing unit 270.

The signal processing unit 270 executes predetermined signal processing including removal of dark current noise for each pixel signal. The signal processing unit 270 outputs image data including the pixel signal after the processing to the DSP circuit 120. The signal processing unit 270 also outputs a control signal for controlling the operation of the mechanical shutter 113 to the mechanical shutter 113.

The bias voltage supply unit 230 selects one of bias voltages $VB_{exp}$ and $VB_{opb}$ different from each other according to a bias selection signal $SEL_{bias}$ from the timing generation unit 220. The timing of switching the bias voltage will be described later. The bias voltage supply unit 230 supplies the bias voltage selected as a bias voltage $VB_{sel}$ to a substrate on which the pixel array unit 250 is provided.

The voltage ratio measuring unit 240 measures a ratio between the bias voltage $VB_{exp}$ and the bias voltage $VB_{opb}$. The voltage ratio measuring unit 240 supplies a measured value R to the signal processing unit 270.

[Example of Configuration of Pixel Array Unit]

Figure 3:
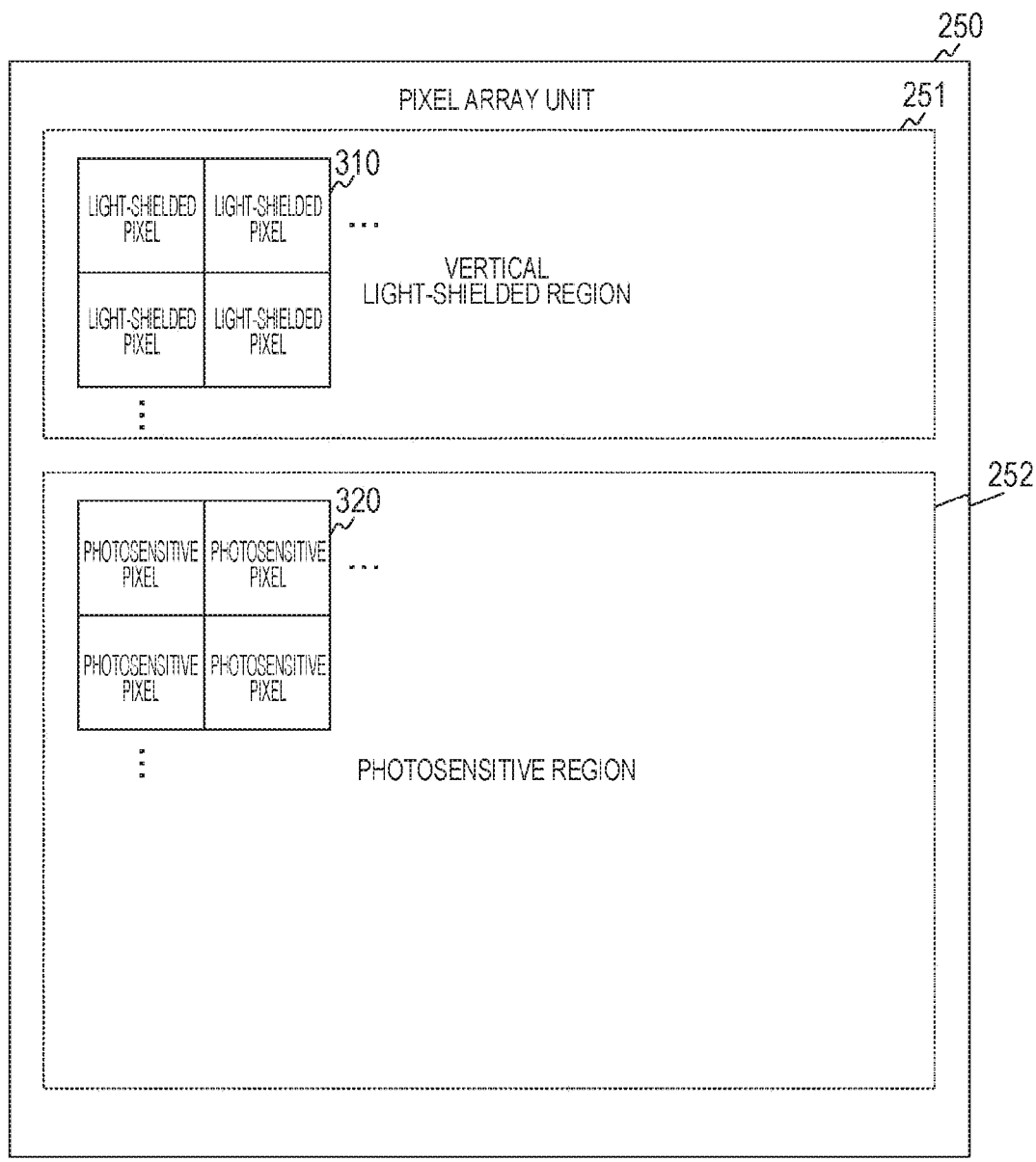
FIG. 3 is an example of a plan view of a pixel array unit according to the first embodiment of the present technology.

FIG. 3 is an example of a plan view of the pixel array unit 250 according to the first embodiment of the present technology. In the pixel array unit 250, a vertical light-shielded region 251 and a photosensitive region 252 are disposed. The vertical light-shielded region 251 is a region in which a plurality of light-shielded pixels 310 is arranged in a two-dimensional lattice, and the photosensitive region 252 is a region in which a plurality of photosensitive pixels 320 is arranged in a two-dimensional lattice. Hereinafter, a pixel signal of the light-shielded pixel 310 is referred to as a "light-shielded pixel signal", and a pixel signal of the photosensitive pixel 320 is referred to as a "photosensitive pixel signal". Also, a row of the photosensitive pixels 320 is referred to as a "photosensitive row", and a row of the light-shielded pixels 310 is referred to as a "light-shielded row".

Moreover, the light-shielded pixel 310 is a pixel impervious to light, and the photosensitive pixel 320 is a pixel not impervious to light. A row address different from that in the photosensitive region 252 is assigned to each of the light-shielded pixels 310 in the vertical light-shielded region 251. Therefore, the pixel signal of the light-shielded pixel 310 is read at a different timing from the pixel signal of the photosensitive pixel 320.

[Example of Configuration of Pixel]

Figure 4:
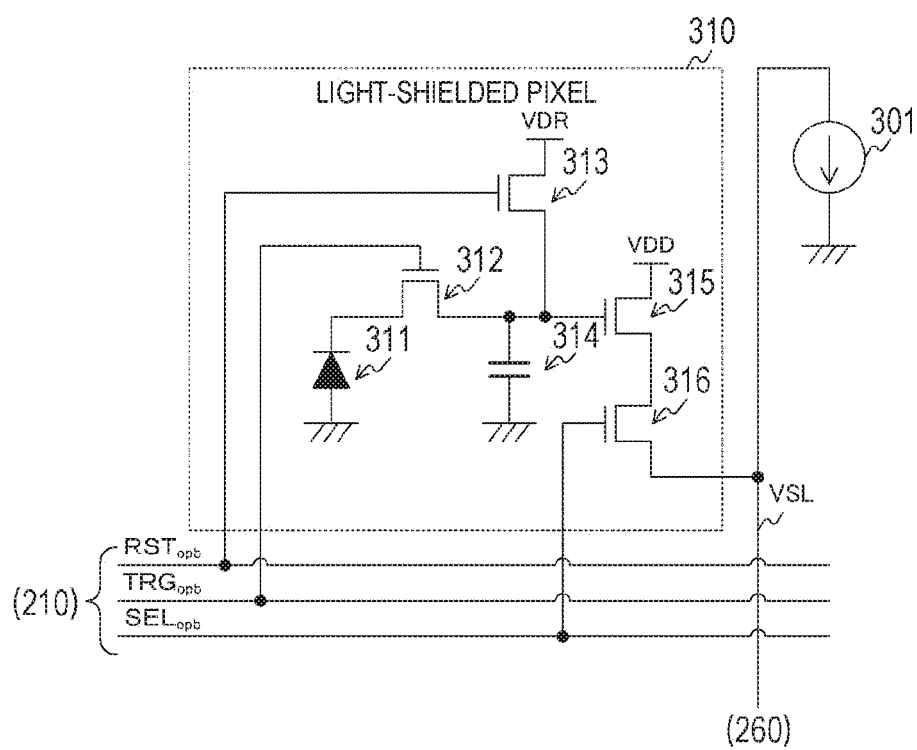
FIG. 4 is a circuit diagram illustrating an example of a configuration of a light-shielded pixel according to the first embodiment of the present technology.

FIG. 4 is a circuit diagram illustrating an example of a configuration of the light-shielded pixel 310 according to the first embodiment of the present technology. The light-shielded pixel 310 includes a photoelectric conversion unit 311, a transfer transistor 312, a floating diffusion region 314, a reset transistor 313, an amplification transistor 315, and a selection transistor 316.

The photoelectric conversion unit 311 is a device of a single element semiconductor (such as a silicon semiconductor) that converts incident light into electric charge. A photodiode or the like is used as the photoelectric conversion unit 311.

The transfer transistor 312 transfers the electric charge from the photoelectric conversion unit 311 to the floating diffusion region 314 according to a transfer signal $TRG_{opb}$ from the address control unit 210.

The reset transistor 313 extracts the electric charge of the floating diffusion region 314 and initializes it according to a reset signal $RST_{opb}$ from the address control unit 210.

The floating diffusion region 314 accumulates the electric charge transferred thereto and generates a voltage corresponding to the amount of the electric charge.

The amplification transistor 315 amplifies the voltage of the floating diffusion region 314. The selection transistor 316 outputs a signal of the voltage after the amplification as a light-shielded pixel signal to the column ADC 260 via a vertical signal line VSL according to a row selection signal $SEL_{opb}$ from the address control unit 210.

Also, a load metal-oxide-semiconductor (MOS) circuit 301 is connected to the vertical signal line VSL.

Note that a circuit configuration of the photosensitive pixel 320 is similar to that of the light-shielded pixel 310. However, the photosensitive pixel 320 is supplied with a transfer signal $TRG_{exp}$, a reset signal $RST_{exp}$, and a row selection signal $SEL_{exp}$ instead of the transfer signal $TRG_{opb}$, the reset signal $RST_{opb}$, and the row selection signal $SEL_{opb}$. Moreover, the circuit configuration of each of the light-shielded pixel 310 and the photosensitive pixel 320 is not limited to the configuration illustrated in the figure as long as the pixel signal can be generated. For example, the configuration may be of a shared type in which the floating diffusion region 314 is shared by a plurality of the pixels.

Figure 5:
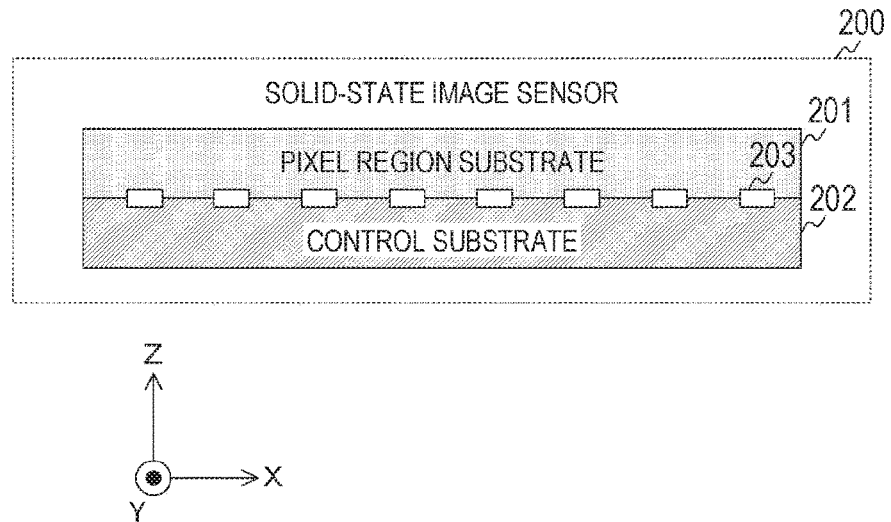
FIG. 5 is an example of a cross-sectional view of the solid-state image sensor according to the first embodiment of the present technology.

FIG. 5 is an example of a cross-sectional view of the solid-state image sensor 200 according to the first embodiment of the present technology. Hereinafter, a direction parallel to an optical axis is defined as a Z direction, and a direction perpendicular to the Z direction and parallel to the rows is defined as an X direction. Moreover, a direction perpendicular to the X and Z directions is defined as a Y direction.

The solid-state image sensor 200 includes a pixel region substrate 201 and a control substrate 202. The light-shielded pixels 310 and the photosensitive pixels 320 are each disposed on the pixel region substrate 201. On the other hand, the circuit (including the address control unit 210 and the signal processing unit 270) other than the pixel array unit 250 is disposed on the control substrate 202. Moreover, the pixel region substrate 201 and the control substrate 202 are laminated in the Z direction and are electrically connected via pieces of metal 203.

A constant bias voltage is supplied to the control substrate 202. On the other hand, a variable bias voltage that is either the bias voltage $VB_{exp}$ or the bias voltage $VB_{opb}$ is supplied to the pixel region substrate 201 by the bias voltage supply unit 230.

Figure 6:
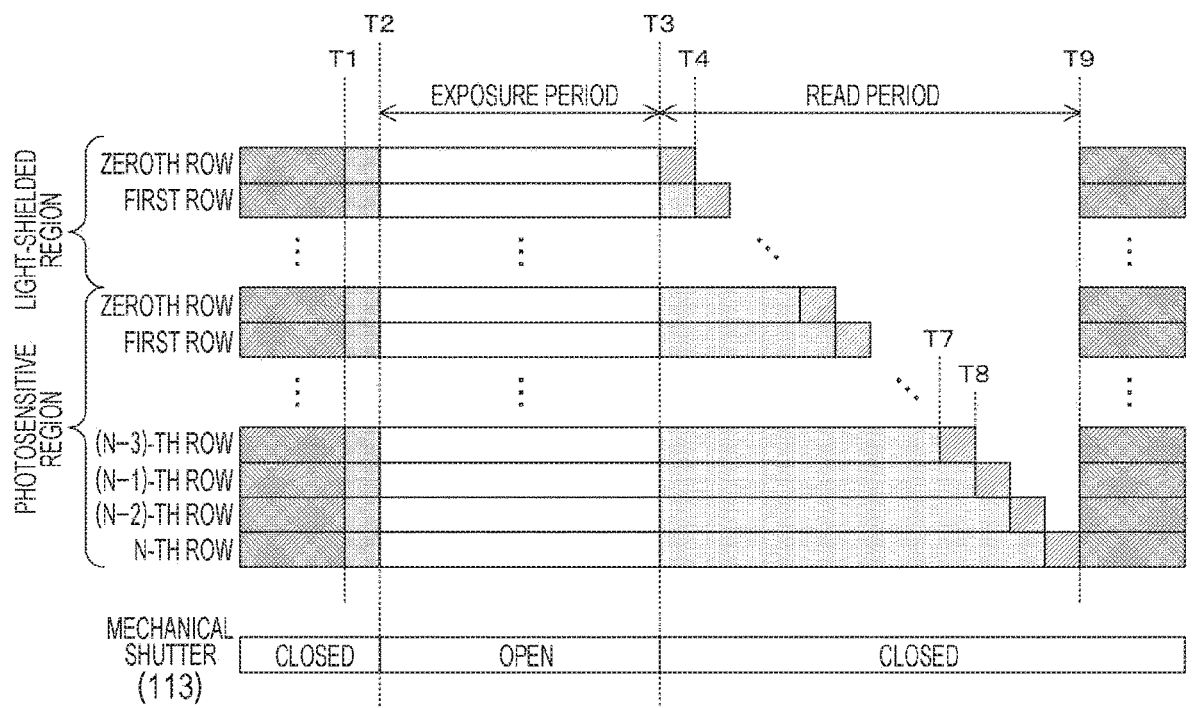
FIG. 6 is a timing diagram illustrating an example of exposure control and read control according to the first embodiment of the present technology.

FIG. 6 is a timing diagram illustrating an example of exposure control and read control according to the first embodiment of the present technology. It is assumed that the number of rows in the vertical light-shielded region 251 equals "M+1" rows (where M is an integer), and the number of rows in the photosensitive region 252 equals "N+1" rows (where N is an integer). The number of rows in the vertical light-shielded region 251 is typically less than the number of rows in the photosensitive region 252.

The address control unit 210 initializes all the rows at timing T1 immediately before timing T2 corresponding to the start of exposure.

The signal processing unit 270 in the solid-state image sensor 200 controls the mechanical shutter 113 to be in an open state at timing T2. As a result, the exposure is started simultaneously for all the pixels. The signal processing unit 270 then controls the mechanical shutter 113 to be in a closed state at timing T3 corresponding to the end of a predetermined exposure period. As a result, the exposure is ended simultaneously for all the pixels. The control of simultaneously starting and ending the exposure for all the pixels as described above is called a global shutter.

Note that although the solid-state image sensor 200 implements the global shutter by controlling the mechanical shutter 113 outside the solid-state image sensor 200, the global shutter can be implemented by a method other than controlling the mechanical shutter 113. For example, a micro electro mechanical systems (MEMS) shutter may be provided in the solid-state image sensor 200, and the global shutter may be implemented by controlling the MEMS shutter. Alternatively, a strobe may be disposed outside the solid-state image sensor 200, and the global shutter may be implemented by the solid-state image sensor 200 causing the strobe to emit pulsed light.

In a read period from timing T3 corresponding to the end of exposure to timing T9, the address control unit 210 sequentially selects a row, and the row outputs a pixel signal. Also, the column ADC 260 reads the pixel signal of the row selected. Since the row address of the light-shielded row is different from that of the photosensitive row as described above, the light-shielded row is read at a different timing from the photosensitive row.

For example, a zeroth row in the vertical light-shielded region 251 is read in a period from timing T3 to timing T4. After that, first to M-th rows in the vertical light-shielded region 251 are read sequentially.

Following the vertical light-shielded region 251, zeroth to N-th rows in the photosensitive region 252 are read sequentially. For example, an (N−3)-th row is read in a period from timing T7 to timing T8. One piece of image data is captured by reading all the rows. When a plurality of pieces of image data is captured, the global shutter and read are repeatedly executed.

Figure 7:
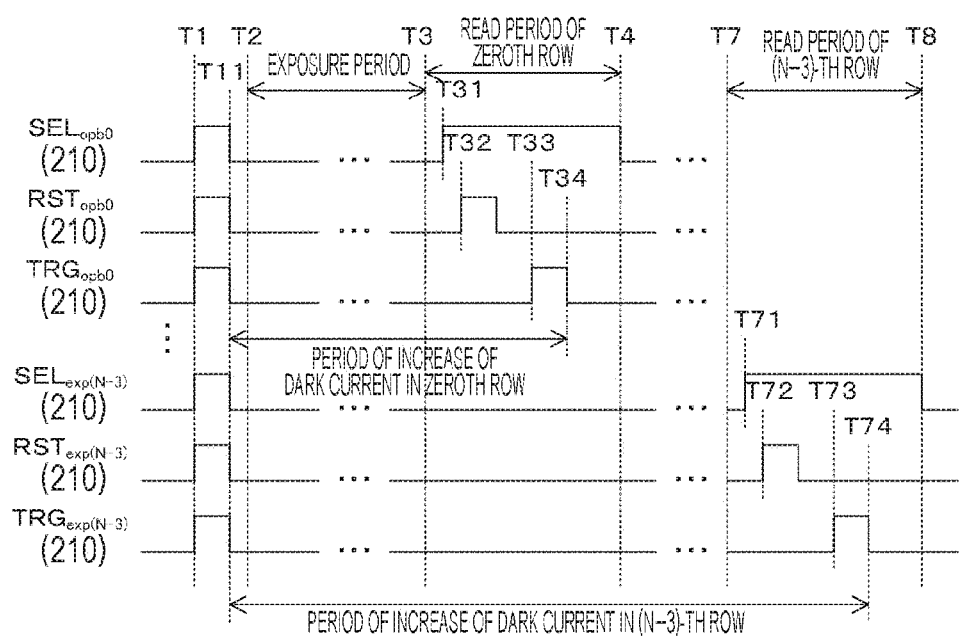
FIG. 7 is a timing diagram illustrating an example of drive control of a transistor according to the first embodiment of the present technology.

FIG. 7 is a timing diagram illustrating an example of drive control of the transistor according to the first embodiment of the present technology. From timing T1 immediately before the start of exposure to timing T11 when a predetermined pulse period elapses, the address control unit 210 supplies high selection signal, reset signal, and transfer signal to all the rows. All the rows are initialized as a result.

Then, from timing T31 immediately after timing T3 corresponding to the end of exposure to timing T4, the address control unit 210 supplies a row selection signal $SEL_{opb0}$ to the zeroth row in the vertical light-shielded region 251.

The address control unit 210 also supplies a reset signal $RST_{opb0}$ to the zeroth row in the vertical light-shielded region 251 for the pulse period from timing T32 immediately after timing T31. As a result, a P phase that is a reset level of the zeroth row is read.

The address control unit 210 supplies a transfer signal $TRG_{opb0}$ to the zeroth row in the vertical light-shielded region 251 for a duration from timing T33 after the P phase is read to timing T34 when the pulse period elapses. As a result, a D phase that is a signal level of the zeroth row is read. The column ADC 260 performs correlated double sampling (CDS) processing for determining a difference between the P phase and the D phase, and outputs a net light-shielded pixel signal after the CDS processing.

After that, the rows are read sequentially by similar control. For example, from timing T71 to timing T8, the address control unit 210 supplies a row selection signal $SEL_{exp}(N-3)$ to the (N-3)-th row in the photosensitive region 252. The address control unit 210 supplies a reset signal $RST_{exp}(N-3)$ to that row for the pulse period from timing T72 immediately after timing T71. The address control unit 210 supplies a transfer signal $TRG_{exp}(N-3)$ to that row for a duration from timing T73 after the P phase is read to timing T74 when the pulse period elapses. By these controls, the (N-3)-th row in the photosensitive region 252 is read.

Here, a dark current of a pixel increases with time in a period from when the pixel is initialized to when a pixel signal is read.

For example, the dark current of the zeroth row in the vertical light-shielded region 251 increases in a period from timing T11 when the row is initialized to timing T34 when the row is read. Likewise, the dark current of the (N-3)-th row in the photosensitive region 252 increases in a period from timing T11 when the row is initialized to timing T74 when the row is read.

Furthermore, when the global shutter is implemented, the initialization timing is the same for all the rows, but the read timing is different for each row. Therefore, the amount of the dark current is different for each row.

[Example of Configuration of Bias Voltage Supply Unit]

Figure 8:
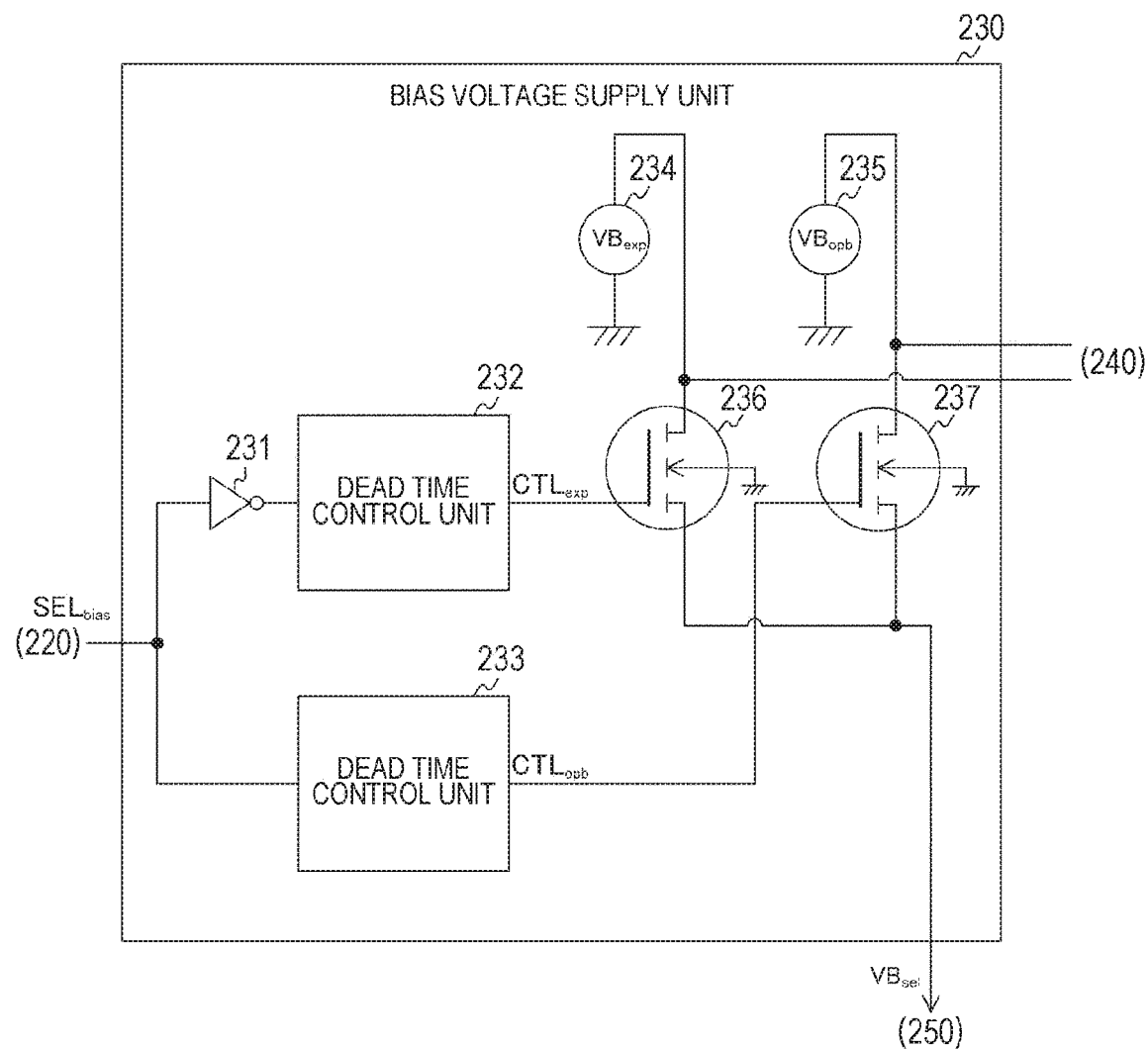
FIG. 8 is a block diagram illustrating an example of a configuration of a bias voltage supply unit according to the first embodiment of the present technology.

FIG. 8 is a block diagram illustrating an example of a configuration of the bias voltage supply unit 230 according to the first embodiment of the present technology. The bias voltage supply unit 230 includes an inverter 231 and dead time control units 232 and 233. The bias voltage supply unit 230 further includes bias voltage sources 234 and 235 and metal-oxide-semiconductor field-effect transistors (MOSFETs) 236 and 237.

The inverter 231 inverts the bias selection signal $SEL_{bias}$ from the timing generation unit 220. The inverter 231 supplies the inverted signal being inverted to the dead time control unit 232.

The dead time control units 232 and 233 control dead time. Here, the dead time is a period in which a gate voltage of the MOSFET 236 and a gate voltage of the MOSFET 237 are both at low level. The provision of the dead time can prevent the bias voltage source 234 and the bias voltage source 235 from being short-circuited at the time of switching due to a difference between turn-on time of one of the MOSFETs 236 and 237 and turn-off time of the other one of the MOSFETs 236 and 237. The dead time control unit 232 delays the rise timing of the inverted signal, for example, and supplies the delayed signal to the gate of the MOSFET 236 as a control signal $CTL_{exp}$. On the other hand, the dead time control unit 233 delays the rise timing of the bias selection signal $SEL_{bias}$, for example, and supplies the delayed signal to the gate of the MOSFET 237 as a control signal $CTL_{opb}$.

The bias voltage sources 234 and 235 generate bias voltages different from each other. The bias voltage source 234 generates the bias voltage $VB_{exp}$ and supplies it to the drain of the MOSFET 236 and the voltage ratio measuring unit 240. On the other hand, the bias voltage source 235 generates the bias voltage $VB_{opb}$ and supplies it to the drain of the MOSFET 237 and the voltage ratio measuring unit 240. A charge pump or the like is used as each of these bias voltage sources 234 and 235. Note that the bias voltage sources 234 and 235 are disposed inside the solid-state image sensor 200, but can be disposed outside the solid-state image sensor 200.

Moreover, for example, N-channel transistors are used as the MOSFETs 236 and 237. The sources of the individual MOSFETs 236 and 237 are commonly connected to the pixel array unit 250. The voltage of the source is supplied as the bias voltage $VB_{sel}$ to the pixel region substrate 201 on which the pixel array unit 250 is disposed.

Figure 9:
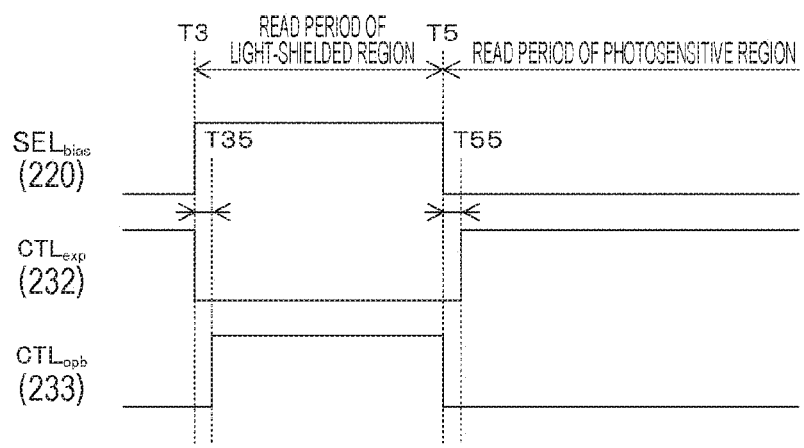
FIG. 9 is a timing diagram illustrating an example of bias voltage switching control according to the first embodiment of the present technology.

FIG. 9 is a timing diagram illustrating an example of bias voltage switching control according to the first embodiment of the present technology. It is assumed that the rows in the vertical light-shielded region 251 are read in a period from timing T3 to timing T5, and the rows in the photosensitive region 252 are read after timing T5. Also, an exposure period precedes timing T3.

The timing generation unit 220 supplies a low bias selection signal $SEL_{bias}$ for instructing selection of the bias voltage $VB_{exp}$ in the exposure period preceding timing T3. Then, in the period from timing T3 to timing T5, the timing generation unit 220 supplies a high bias selection signal $SEL_{bias}$ for instructing selection of the bias voltage $VB_{opb}$. The dead time control unit 233 delays the rise of the bias selection signal $SEL_{bias}$ to timing T35, and supplies the delayed signal as the control signal $CTL_{opb}$. A period from timing T3 to timing T35 corresponds to the dead time. This dead time is determined depending on the process used.

The timing generation unit 220 supplies the low bias selection signal $SEL_{bias}$ after timing T5. The dead time control unit 232 delays the rise of the inverted signal of the bias selection signal $SEL_{bias}$ to timing T55, and supplies the delayed signal as the control signal $CTL_{exp}$. A period from timing T5 to T55 corresponds to the dead time.

The bias voltage supply unit 230 supplies the bias voltage $VB_{opb}$ to the pixel region substrate 201 as the bias voltage $VB_{sel}$ in the read period of the vertical light-shielded region 251 except for the dead time. On the other hand, the bias voltage supply unit 230 supplies the bias voltage $VB_{exp}$ to the pixel region substrate 201 as the bias voltage $VB_{sel}$ in the read period of the photosensitive region 252 except for the dead time.

The dark current typically increases in proportion to the bias voltage. In order to increase the dark current in the read period of the vertical light-shielded region 251, the solid-state image sensor 200 sets the bias voltage $VB_{opb}$ in that period to a value higher than that of the bias voltage $VB_{exp}$ at the time of reading the photosensitive region 252. An effect produced as a result of increasing the dark current by controlling the bias voltage will be described later.

Note that the timing generation unit 220 instructs the selection of the bias voltage $VB_{opb}$ by the high bias selection signal $SEL_{bias}$, but can also instruct the selection of the bias voltage $VB_{opb}$ by the low bias selection signal $SEL_{bias}$.

Figure 10:
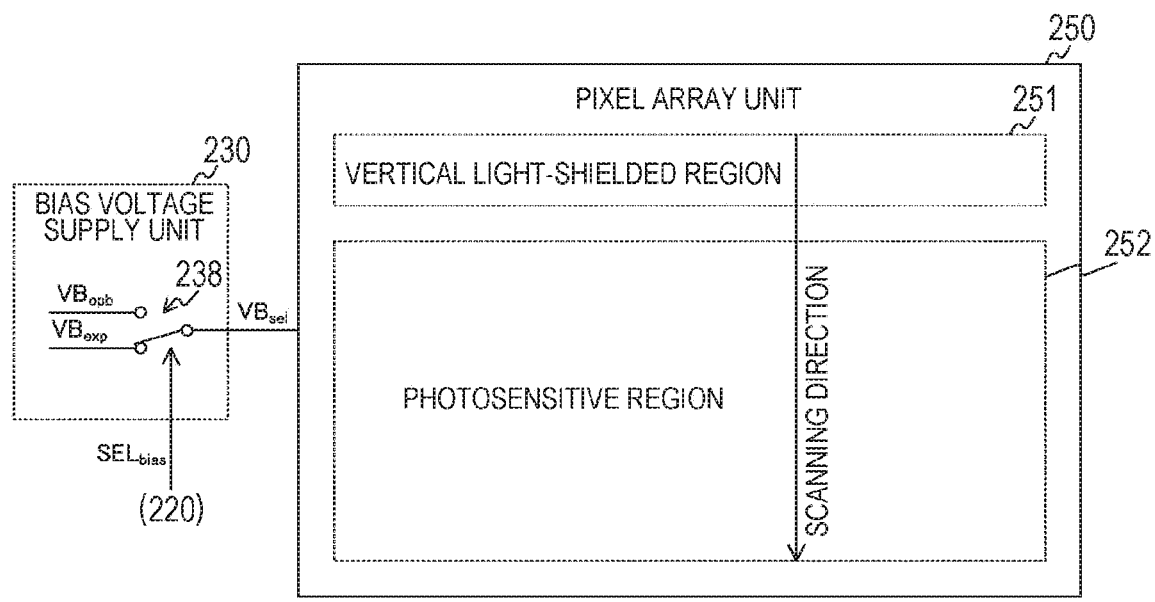
FIG. 10 is a diagram in which the bias voltage supply unit and the pixel array unit according to the first embodiment of the present technology are simplified.

FIG. 10 is a diagram in which the bias voltage supply unit 230 and the pixel array unit 250 according to the first embodiment of the present technology are simplified. In the figure, the circuit including the inverter 231, the dead time control units 232 and 233, and the MOSFETs 236 and 237 in the bias voltage supply unit 230 is simplified and represented by a switch 238. It is also assumed that, for example, the vertical light-shielded region 251 is scanned first, and then the photosensitive region 252 is scanned. This order of scanning allows the light-shielded pixel signal to be output from the vertical light-shielded region 251, and then the photosensitive pixel signal to be output from the photosensitive region 252. Note that the address control unit 210 can reverse the scanning direction to scan the vertical light-shielded region 251 after the photosensitive region 252.

The bias voltage supply unit 230 supplies the bias voltage $VB_{opb}$ to the entire pixel array unit 250 in the period (that is, the read period) in which the light-shielded pixel signal is output from the vertical light-shielded region 251. On the other hand, the bias voltage supply unit 230 switches to the bias voltage $VB_{exp}$ in the period (that is, read period) in which the photosensitive pixel signal is output from the photosensitive region 252, and supplies the voltage to the entire pixel array unit 250.

[Example of Configuration of Voltage Ratio Measuring Unit]

Figure 11:
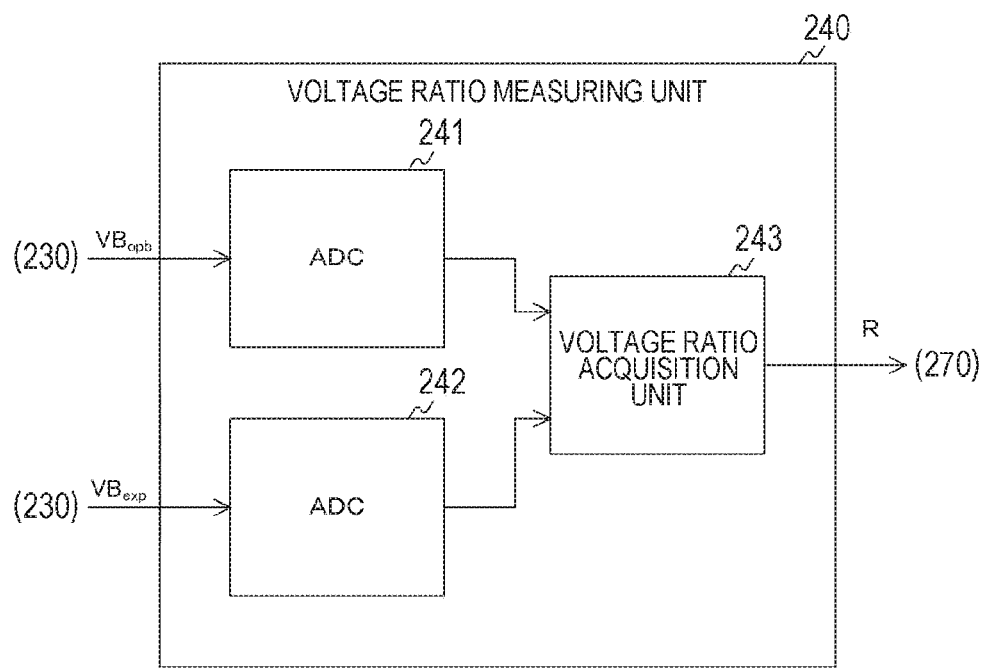
FIG. 11 is a block diagram illustrating an example of a configuration of a voltage ratio measuring unit according to the first embodiment of the present technology.

FIG. 11 is a block diagram illustrating an example of a configuration of the voltage ratio measuring unit 240 according to the first embodiment of the present technology. The voltage ratio measuring unit 240 includes ADCs 241 and 242 and a voltage ratio acquisition unit 243.

The ADC 241 performs AD conversion on the bias voltage $VB_{op}b$ and supplies it to the voltage ratio acquisition unit 243. The ADC 242 performs AD conversion on the bias voltage $VB_{exp}$ and supplies it to the voltage ratio acquisition unit 243.

The voltage ratio acquisition unit 243 calculates a measured value R of a voltage ratio of the bias voltage $VB_{opb}$ to the bias voltage $VB_{exp}$ after the AD conversion by using the following expression. The measured value R is supplied to the signal processing unit 270.

$$R = VB_{opb}/VB_{exp}$$

The bias voltages $VB_{opb}$ and $VB_{exp}$ are measured in this way in the solid-state image sensor 200, so that the signal processing unit 270 can perform optimum dark current correction depending on the use conditions. Note that the bias voltage can also be measured outside the solid-state image sensor 200.

Figure 12:
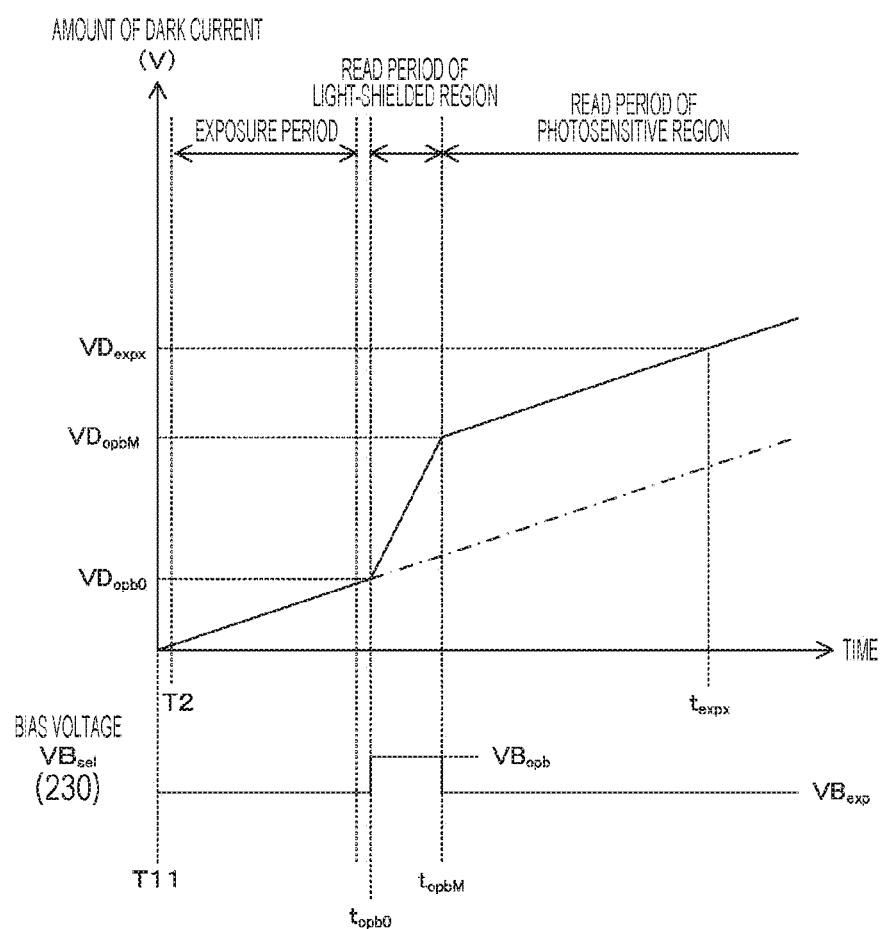
FIG. 12 is an example of a graph illustrating a change in the amount of dark current over time according to the first embodiment of the present technology.

FIG. 12 is an example of a graph illustrating a change in the amount of dark current over time according to the first embodiment of the present technology. In the figure, the vertical axis represents the amount of dark current of a row being read, and the horizontal axis represents time elapsed from timing T11 immediately after initialization. The amount of dark current is expressed by a value obtained by converting a statistic (average or total) of dark currents generated in individual pixels in the row being read into a voltage.

In the exposure period, the amount of dark current increases with time at a constant rate. In the read period of the vertical light-shielded region 251 from timing $t_{opb0}$ immediately after the end of the exposure period to timing $t_{opbM}$, the bias voltage supply unit 230 switches the bias voltage from $VB_{exp}$ to higher $VB_{opb}$. The increase in the bias voltage increases the dark current, so that the rate of increase of the dark current in this period becomes faster than that in the exposure period. In other words, a slope of a straight line representing the change in the amount of dark current per time increases.

In the read period of the photosensitive region 252 after timing $t_{opbM}$, the bias voltage supply unit 230 switches the bias voltage to the original $VB_{exp}$. As a result, the rate of increase of the dark current slows to have the same value as that in the exposure period. In other words, the slope of the straight line becomes the same as that in the exposure period.

The light-shielded pixel signal is affected by the dark current alone and not by brightness, whereas the photosensitive pixel signal is a signal obtained by adding the dark current and a signal corresponding to brightness. Therefore, the dark current in the photosensitive pixel signal cannot be determined directly. However, since the dark current increases with time, the amount of dark current is different for each row in the global shutter in which the time until read is different for each row. Accordingly, the dark current of a certain photosensitive pixel may be determined by finding the rate of increase (slope) of the dark current from the light-shielded pixel signal and multiplying the rate by the read time of the photosensitive pixel signal.

Here, a comparative example that does not switch the bias voltage is assumed. In this comparative example, the rate of increase of the dark current is constant as illustrated by a dot-dash line. With this configuration, a calculated value of the rate of increase possibly has a large error in a case where the rate of increase in the read period of the vertical light-shielded region 251 is very small. This increase in the error reduces the accuracy of correcting the dark current and possibly causes noise in image data due to the dark current. For example, streak-like noise occurs in image data, and this noise is called shading.

However, in the solid-state image sensor 200, the bias voltage supply unit 230 increases the bias voltage in the read period of the vertical light-shielded region 251. The increase in the bias voltage increases the dark current per unit electric charge of the photoelectric conversion unit 311 within the pixel. Since the amount of electric charge increases with time, the rate of increase (slope) of the dark current increases due to the increase in the dark current per unit electric charge. This reduces the error in the calculated value of the rate of increase (slope). This reduction in the error can improve the accuracy of correcting the dark current and prevent shading.

Note that although the accuracy of correcting the dark current can be improved by increasing the number of light-shielded rows or adding a horizontal light-shielded region, this method reduces the ratio of the area of the photosensitive region 252 to the entire pixel array unit 250 and thus is not preferable.

Figure 13:
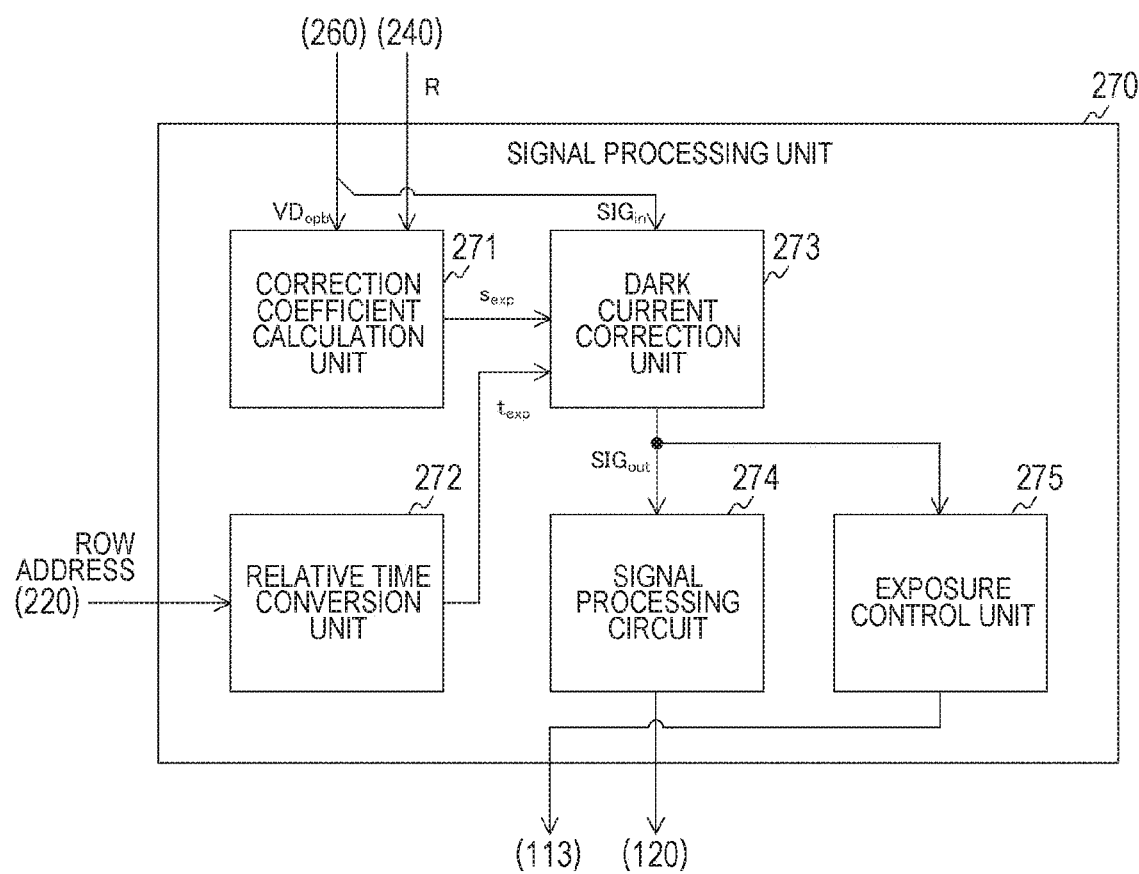
FIG. 13 is a block diagram illustrating an example of a configuration of a signal processing unit according to the first embodiment of the present technology.

FIG. 13 is a block diagram illustrating an example of a configuration of the signal processing unit 270 according to the first embodiment of the present technology. The signal processing unit 270 includes a correction coefficient calculation unit 271, a relative time conversion unit 272, a dark current correction unit 273, a signal processing circuit 274, and an exposure control unit 275.

The correction coefficient calculation unit 271 calculates correction coefficients $s_{opb}$ and $s_{exp}$. Here, the correction coefficient $s_{exp}$ represents the rate of increase of the dark current in the read period of the photosensitive region 252, and has the same value as the slope of the straight line within that period illustrated in FIG. 12, for example. Moreover, the correction coefficient $s_{opb}$ represents the rate of increase of the dark current in the read period of the vertical light-shielded region 251, and has the same value as the slope of the straight line within that period illustrated in FIG. 12, for example. In the read period of the vertical light-shielded region 251, the rate of increase of the dark current is relatively fast due to the high bias voltage. Therefore, the correction coefficient $s_{opb}$ has a larger value than the correction coefficient $s_{exp}$. Calculating the relatively small correction coefficient $s_{exp}$ is more difficult than calculating the correction coefficient $s_{opb}$, so that the correction coefficient calculation unit 271 acquires the light-shielded pixel signal from the pixel array unit 250 and calculates the correction coefficient $s_{opb}$ first using the following expression.

$$s_{opb}=(VD_{opbM}-VD_{opb0})/(t_{opbM}-t_{opb0}) \quad \text{Expression 1}$$

In the above expression, $VD_{opbM}$ represents a statistic (total or average) of the light-shielded pixel signals of the last light-shielded row (that is, the M-th row) in the vertical light-shielded region 251, and represents the amount of dark current of that row. Also, $VD_{opb0}$ represents a statistic (total or average) of the light-shielded pixel signals of the first light-shielded row (that is, the zeroth row) in the vertical light-shielded region 251, and represents the amount of dark current of that row. Moreover, $t_{opbM}$ represents the read time of the last light-shielded row, and $t_{opb0}$ represents the read time of the first light-shielded row. These times are relative times based on timing T11 of initialization.

Next, the correction coefficient calculation unit 271 uses the calculated $s_{opb}$ and the measured value R of the voltage ratio to calculate the correction coefficient $s_{exp}$ by the following expression, for example.

$$s_{exp}=(\alpha \times R+\beta) \times s_{opb}+\gamma \quad \text{Expression 2}$$

In the above expression, $\alpha$ represents a coefficient dependent on the voltage ratio, and $\beta$ represents a coefficient independent of the voltage ratio. Moreover, $\gamma$ represents a fixed coefficient.

The coefficients $\alpha$, $\beta$, and $\gamma$ are calculated in advance from an approximate expression based on a measurement result of a created pixel at the time of evaluation or balancing thereof, and are set by register communication. Alternatively, the coefficients are set by a non-volatile storage element with a built-in chip on which the solid-state image sensor 200 is mounted.

Note that although the correction coefficient $s_{opb}$ is calculated within the solid-state image sensor 200, the correction coefficient can be calculated outside by, for example, a microcomputer controlling the solid-state image sensor 200 and reflected in the solid-state image sensor 200. Moreover, the correction coefficient calculation unit 271 calculates the correction coefficient $s_{exp}$ using Expression 2 but can use an expression or a function other than Expression 2 as long as the coefficient can be calculated with high accuracy.

Furthermore, in each image data (frame), dark current correction is performed using the dark current determined in that frame, but the present technology is not limited to this configuration. For example, the solid-state image sensor 200 can improve the accuracy of dark current correction by accumulating and using the dark current of a certain frame as reference information for a next frame. Specifically, the solid-state image sensor 200 need only hold the dark current of a past frame as reference information in a memory or the like, and subtract an average of the dark current of a current frame and the reference information from the photosensitive pixel signal.

Subsequently, the correction coefficient calculation unit 271 supplies the correction coefficient $s_{exp}$ calculated to the dark current correction unit 273. Note that the correction coefficient calculation unit 271 is an example of a correction coefficient acquisition unit described in the claims.

The relative time conversion unit 272 converts a row address of a photosensitive row from the timing generation unit 220 into a read time of that row. This read time is a relative time based on timing T11 of initialization. The relative time conversion unit 272 supplies the time after the conversion for an x-th row to the dark current correction unit 273 as timing $t_{expx}$.

The dark current correction unit 273 performs dark current correction that removes dark current noise from a photosensitive pixel signal $SIG_{in}$ using the correction coefficient $s_{exp}$. The dark current correction unit 273 determines an amount of dark current $VD_{expx}$ included in the photosensitive pixel signal $SIG_{in}$ to be corrected by the following expression.

$$VD_{expx}=VD_{opbM}+s_{exp}(t_{expx}-t_{exp0}) \quad \text{Expression 3}$$

In the above expression, $t_{exp0}$ represents the read time of the first row (that is, the zeroth row) in the photosensitive region 252.

Then, the dark current correction unit 273 removes the amount of dark current determined from the photosensitive pixel signal $SIG_{in}$. For example, in a case where the amount of dark current $VD_{expx}$ is an average of the dark currents of the columns, the dark current correction unit 273 subtracts the amount of dark current $VD_{expx}$ from the photosensitive pixel signal $SIG_{in}$ as it is. On the other hand, in a case where the amount of dark current $VD_{expx}$ is a total of the dark currents of the columns, the dark current correction unit 273 divides the amount of dark current $VD_{expx}$ by the number of columns and subtracts the quotient from the photosensitive pixel signal $SIG_{in}$. As a result, the dark current correction for removing the dark current noise such as shading in the image data can be performed.

Then, the dark current correction unit 273 supplies a signal after removing the dark current noise to the signal processing circuit 274 and the exposure control unit 275 as a photosensitive pixel signal $SIG_{out}$.

The signal processing circuit 274 performs various signal processings other than the dark current correction on the photosensitive pixel signal $SIG_{out}$ and supplies the signal to the DSP circuit 120.

The exposure control unit 275 measures the amount of light from the photosensitive pixel signal $SIG_{out}$ and controls an exposure time and an aperture value on the basis of the amount of light measured. The exposure control unit 275 controls the exposure time by controlling the timing of opening/closing the mechanical shutter 113, for example. As a result, an auto exposure (AE) function is implemented. Note that the exposure control unit 275 is disposed inside the solid-state image sensor 200, but can be disposed outside the solid-state image sensor 200. Moreover, the exposure control unit 275 controls the exposure time by the AE function, but can also control the exposure time according to a user's operation.

Note that some or all of the processings in the signal processing unit 270 may be performed outside the solid-state image sensor 200 (for example, by the DSP circuit 120).

[Example of Operation of Imaging Apparatus]

Figure 14:
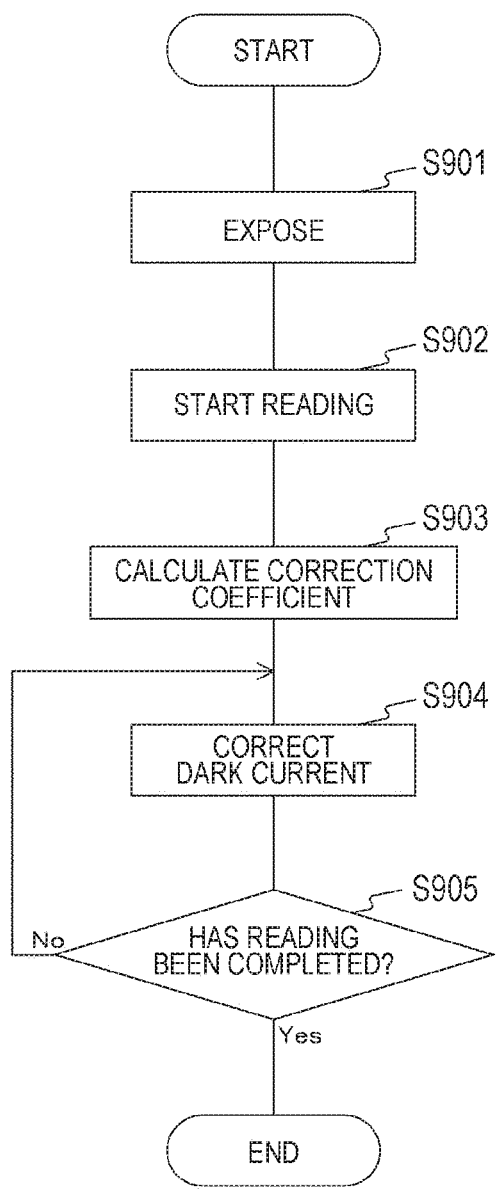
FIG. 14 is a flowchart illustrating an example of an operation of the imaging apparatus according to the first embodiment of the present technology.

FIG. 14 is a flowchart illustrating an example of an operation of the imaging apparatus 100 according to the first embodiment of the present technology. This operation is started, for example, when an application for capturing image data is executed.

The imaging apparatus 100 exposes the solid-state image sensor 200 by opening/closing the mechanical shutter 113 or the like (step S901). After being exposed, the solid-state image sensor 200 starts reading pixel signals (step S902). Furthermore, the signal processing unit 270 in the solid-state image sensor 200 calculates the correction coefficient $s_{exp}$ (step S903), and uses that coefficient to perform dark current correction on rows being read (step S904). The solid-state image sensor 200 then determines whether or not all the rows have been read (step S905).

If the reading has not been completed (No in step S905), the solid-state image sensor 200 repeatedly executes step S904 and subsequent steps. On the other hand, if the reading has been completed (Yes in step S905), the solid-state image sensor 200 executes signal processing or the like and ends the operation of capturing the image data. In a case where a plurality of pieces of image data is captured continuously, the processing from step S901 onward is executed repeatedly in synchronization with a vertical synchronization signal.

According to the first embodiment of the present technology described above, in the period in which the light-shielded pixel signal is output, the bias voltage supply unit 230 supplies the bias voltage different from that supplied in the period in which the photosensitive pixel signal is output, whereby the rate of increase of the dark current can be increased. Thus, as compared to a case where the bias voltage is not switched, the correction coefficient $s_{opb}$ indicating the rate of increase of the dark current is increased, and the signal processing unit 270 can calculate the coefficient with high accuracy. With this highly accurate correction coefficient $s_{opb}$, the correction coefficient $s_{exp}$ can be calculated with high accuracy, and the correction accuracy can be improved in the dark current correction using that coefficient in Expression 3 or the like. As a result, the dark current noise is reduced, and the image quality of the image data is improved.

[First Variation]

In the first embodiment described above, the solid-state image sensor 200 performs photoelectric conversion by the photoelectric conversion unit 311 of a single element semiconductor, but with this configuration, it is difficult to further improve the photoelectric conversion efficiency. The solid-state image sensor 200 according to a first variation of the first embodiment is different from that of the first embodiment in that photoelectric conversion is performed by a compound semiconductor.

Figure 15:
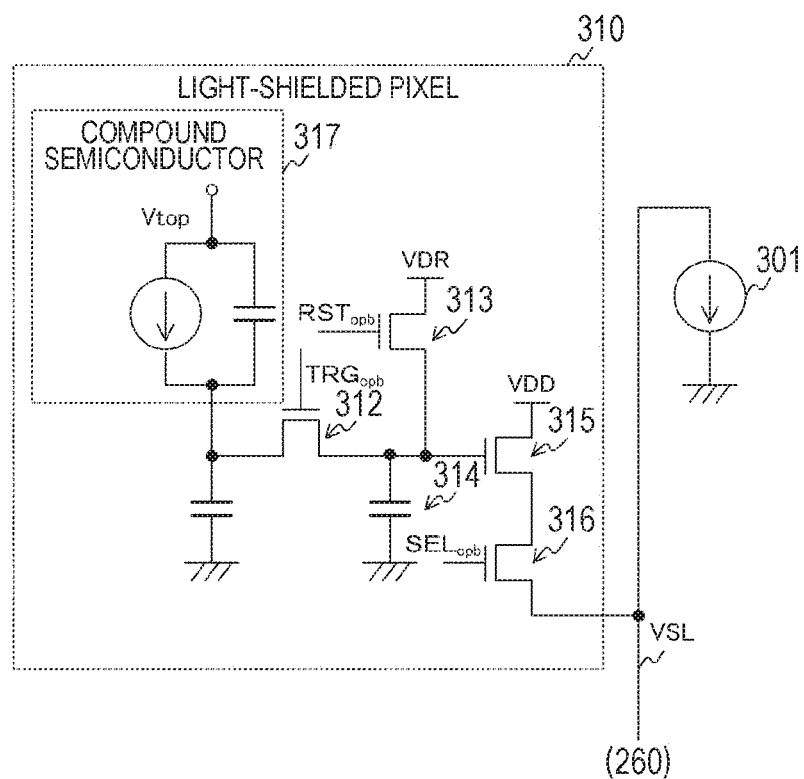
FIG. 15 is a circuit diagram illustrating an example of a configuration of the light-shielded pixel according to a first variation of the first embodiment of the present technology.

FIG. 15 is a circuit diagram illustrating an example of a configuration of the light-shielded pixel 310 according to the first variation of the first embodiment of the present technology. The light-shielded pixel 310 according to the first variation of the first embodiment is different from that of the first embodiment in that a photoelectric conversion unit 317 of a compound semiconductor is included instead of the photoelectric conversion unit 311 of the single element semiconductor. As the compound semiconductor, for example, indium gallium arsenide (InGaAs) is used. A compound semiconductor is also used in the photosensitive pixel 320.

By using the compound semiconductor, the photoelectric conversion efficiency can be improved as compared with the case where the single element semiconductor is used. Note that the pixel array unit 250 may perform photoelectric conversion with an organic photoconductor or a quantum photoconductor instead of the single element semiconductor or the compound semiconductor.

As described above, the first embodiment of the present technology uses the photoelectric conversion unit 317 of the compound semiconductor and thus can improve the photoelectric conversion efficiency as compared with the case where the photoelectric conversion unit 311 of the single element semiconductor is used.

[Second Variation]

In the first embodiment described above, the vertical light-shielded region 251 is disposed only on the upper side of the photosensitive region 252, which, however, possibly results in an insufficient number of the light-shielded rows. The solid-state image sensor 200 according to a second variation of the first embodiment is different from that of the first embodiment in that the vertical light-shielded region is disposed on each of both upper and lower sides of the photosensitive region.

Figure 16:
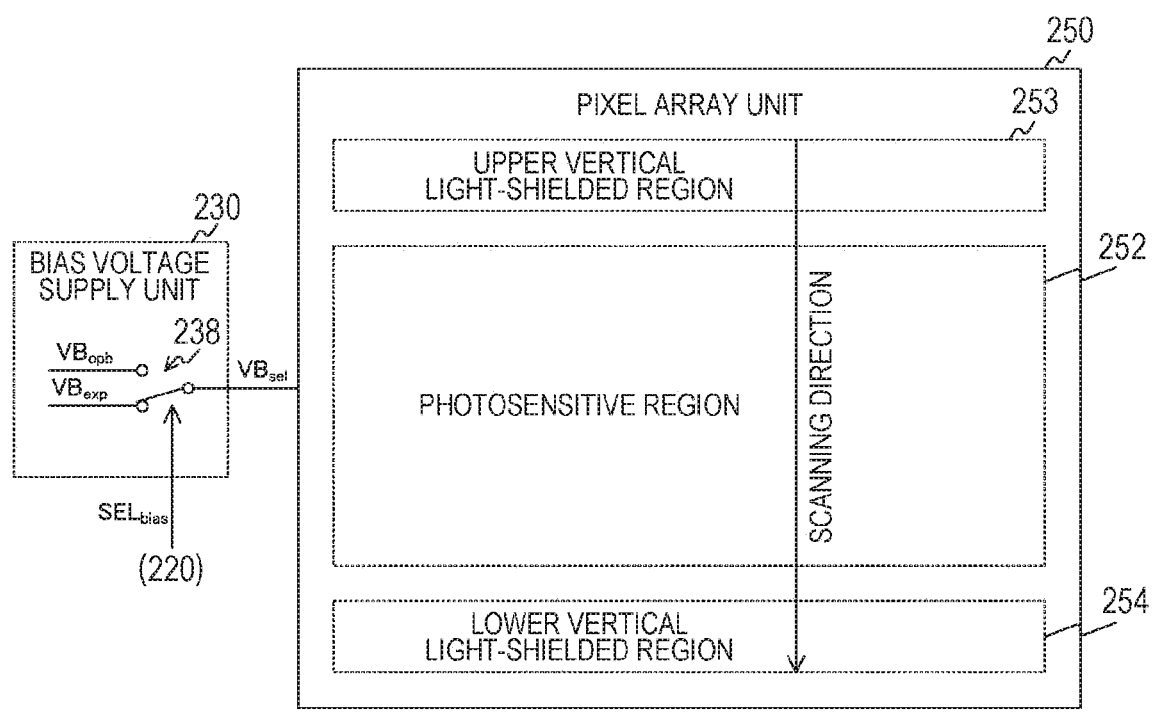
FIG. 16 is a diagram in which the bias voltage supply unit and the pixel array unit according to a second variation of the first embodiment of the present technology are simplified.

FIG. 16 is a diagram in which the bias voltage supply unit 230 and the pixel array unit 250 according to the second variation of the first embodiment of the present technology are simplified. The pixel array unit 250 according to the second variation of the first embodiment is different from that of the first embodiment in that an upper vertical light-shielded region 253 and a lower vertical light-shielded region 254 are disposed instead of the vertical light-shielded region 251.

Assuming that the direction toward the first row to be scanned in the scanning direction is upward, the upper vertical light-shielded region 253 is disposed on an upper side of the photosensitive region 252. On the other hand, the lower vertical light-shielded region 254 is disposed on a lower side of the photosensitive region 252. Furthermore, the number of rows of each of the upper vertical light-shielded region 253 and the lower vertical light-shielded region 254 is equal to M+1 rows as in the vertical light-shielded region 251. Note that the upper vertical light-shielded region 253 and the lower vertical light-shielded region 254 may have different numbers of rows.

Note that the upper vertical light-shielded region 253 is an example of a first vertical light-shielded region described in the claims, and the lower vertical light-shielded region 254 is an example of a second vertical light-shielded region described in the claims.

Figure 17:
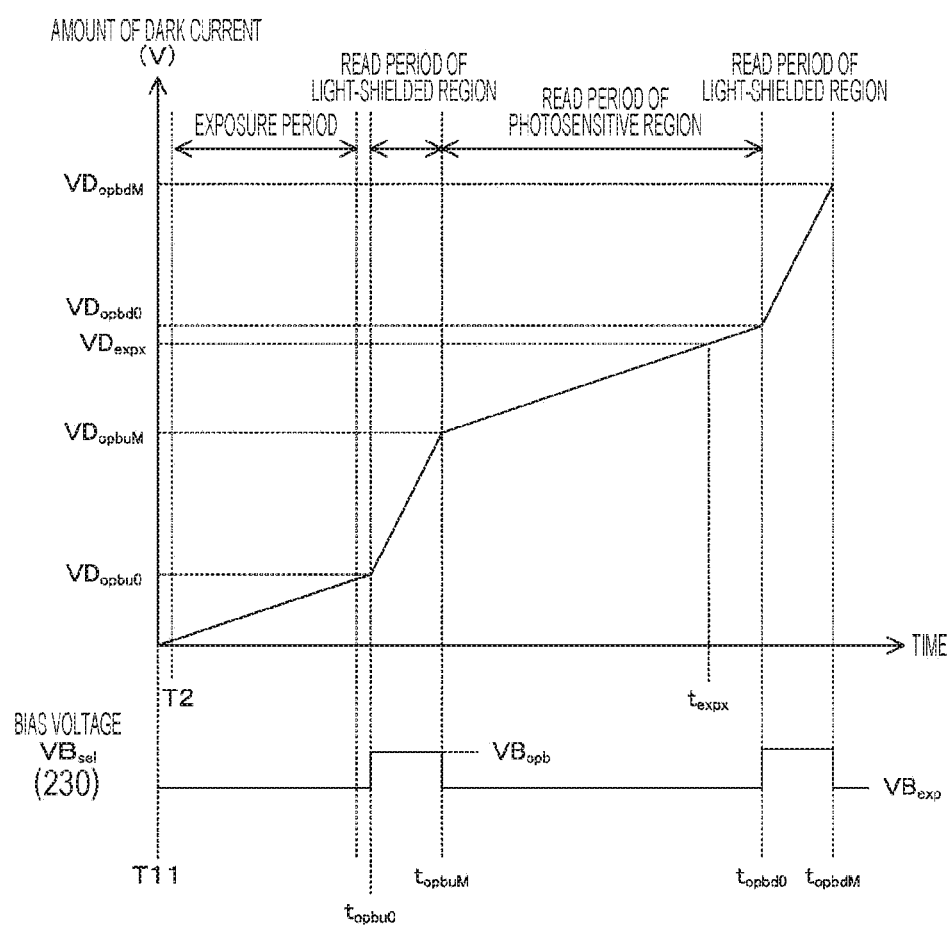
FIG. 17 is an example of a graph illustrating a change in the amount of dark current over time according to the second variation of the first embodiment of the present technology.

FIG. 17 is an example of a graph illustrating a change in the amount of dark current over time according to the second variation of the first embodiment of the present technology.

In a read period of the upper vertical light-shielded region 253 from timing $t_{opbu0}$ to timing $t_{opbuM}$, the bias voltage supply unit 230 switches the bias voltage from $VB_{exp}$ to $VB_{opb}$. As a result, the rate of increase of the dark current in this period becomes faster than that in the exposure period.

In a read period of the photosensitive region 252 from timing $t_{opbuM}$ to timing $t_{opbd0}$, the bias voltage supply unit 230 switches the bias voltage to the original $VB_{exp}$. As a result, the rate of increase of the dark current becomes slow.

Then in a read period of the lower vertical light-shielded region 254 from timing $t_{opbd0}$ to timing $t_{opbdM}$, the bias voltage supply unit 230 switches the bias voltage from $VB_{exp}$ to $VB_{opb}$. As a result, the rate of increase of the dark current in this period becomes faster than that in the exposure period.

Then, the correction coefficient calculation unit 271 first calculates the correction coefficient $s_{opb}$ by using the following expression instead of Expression 1.

$$s_{opb} = \{(VD_{opbuM} - VD_{opbu0}) + (VD_{opbdM} - VD_{opbd0})\} / \{(t_{opbuM} - t_{opbu0}) + (t_{opbdM} - t_{opbd0})\}$$

In the above expression, $VD_{opbuM}$ represents an amount of the dark current of the last light-shielded row in the upper vertical light-shielded region 253, and $VD_{opbu0}$ represents an amount of the dark current of the first light-shielded row in that region. Also, $VD_{opbdM}$ represents an amount of the dark current of the last light-shielded row in the lower vertical light-shielded region 254, and $VD_{opbd0}$ represents an amount of the dark current of the first light-shielded row in that region.

As described above, the second variation of the first embodiment of the present technology disposes the light-shielded region not only on the upper side but also on the lower side, thereby being able to increase the number of the light-shielded rows as compared to the case where the light-shielded region is disposed only on the upper side, and improve the accuracy of correcting the dark current.

2. Second Embodiment

In the first embodiment described above, the bias voltage supply unit 230 switches the bias voltage to the pixel array unit 250 to either the bias voltage $VB_{opb}$ or $VB_{exp}$ according to the bias selection signal $SEL_{bias}$. However, this configuration requires elements and circuits (the MOSFETs 236 and 237 and the like) for switching the bias voltage, and the elements and circuits possibly increase the circuit scale of the solid-state image sensor 200. The solid-state image sensor 200 of the second embodiment is different from that of the first embodiment in that the bias voltage is not switched.

Figure 18:
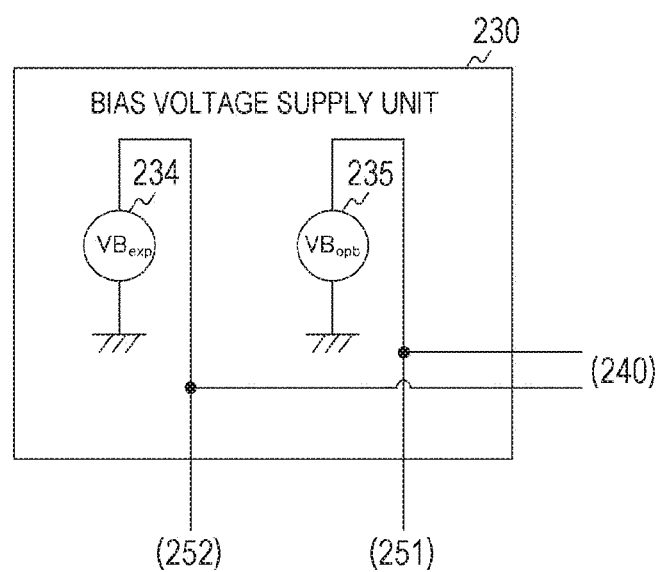
FIG. 18 is a block diagram illustrating an example of a configuration of a bias voltage supply unit according to a second embodiment of the present technology.

FIG. 18 is a block diagram illustrating an example of a configuration of the bias voltage supply unit 230 according to the second embodiment of the present technology. The bias voltage supply unit 230 of the second embodiment is different from that of the first embodiment in that the inverter 231, the dead time control units 232 and 233, and the MOSFETs 236 and 237 are not disposed.

Moreover, the bias voltage source 234 of the second embodiment supplies the bias voltage $VB_{exp}$ to the photosensitive region 252 and the voltage ratio measuring unit 240. Also, the bias voltage source 235 supplies the bias voltage $VB_{opb}$ to the vertical light-shielded region 251 and the voltage ratio measuring unit 240.

Figure 19:
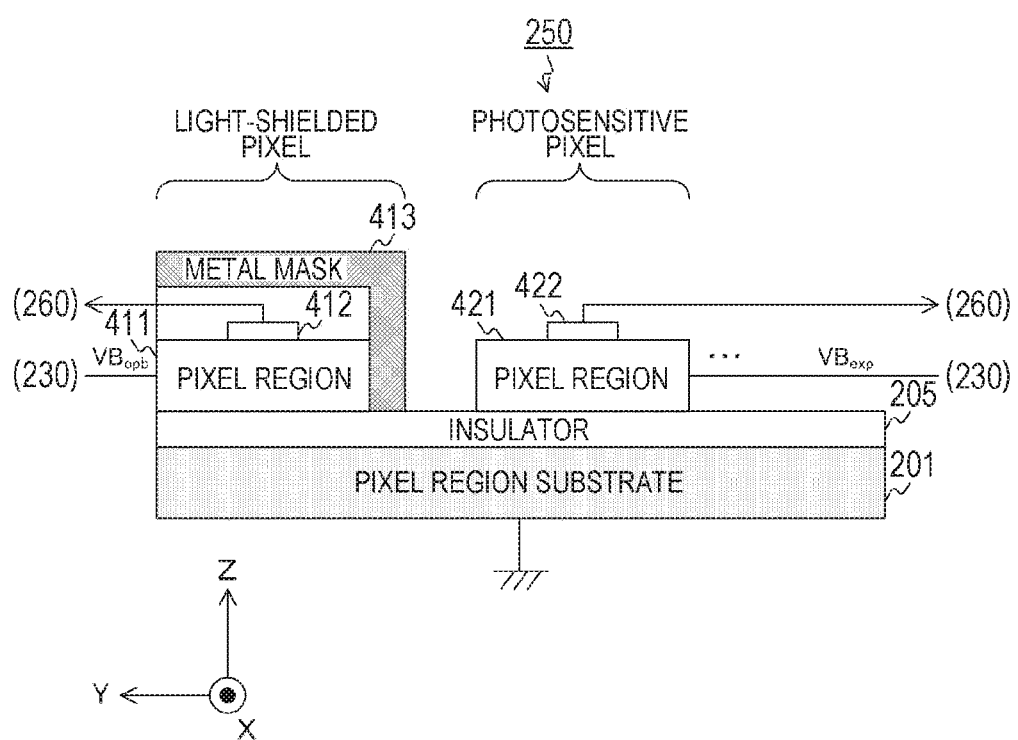
FIG. 19 is an example of a cross-sectional view of a pixel array unit according to the second embodiment of the present technology.

FIG. 19 is an example of a cross-sectional view of the pixel array unit 250 according to the second embodiment of the present technology. With the direction of incident light being upward, a layer of an insulator 205 is provided on top of the pixel region substrate 201. The light-shielded pixel 310 and the photosensitive pixel 320 are disposed on top of the insulator 205.

The light-shielded pixel 310 includes a pixel region 411, an output terminal 412, and a metal mask 413. In the pixel region 411, the photoelectric conversion unit 311 and the source and drain of the transistor are disposed. The bias voltage $VB_{opb}$ is supplied to the pixel region 411. The output terminal 412 is a terminal for outputting the light-shielded pixel signal to the column ADC 260. The metal mask 413 is a member that shields the pixel region 411 from light.

The configuration of the photosensitive pixel 320 is similar to that of the light-shielded pixel 310 except that the metal mask 413 is not provided and the bias voltage $VB_{exp}$ is supplied. Furthermore, a groove is formed between the light-shielded pixel 310 and the photosensitive pixel 320 by etching. The pixels are separated as a result.

Figure 20:
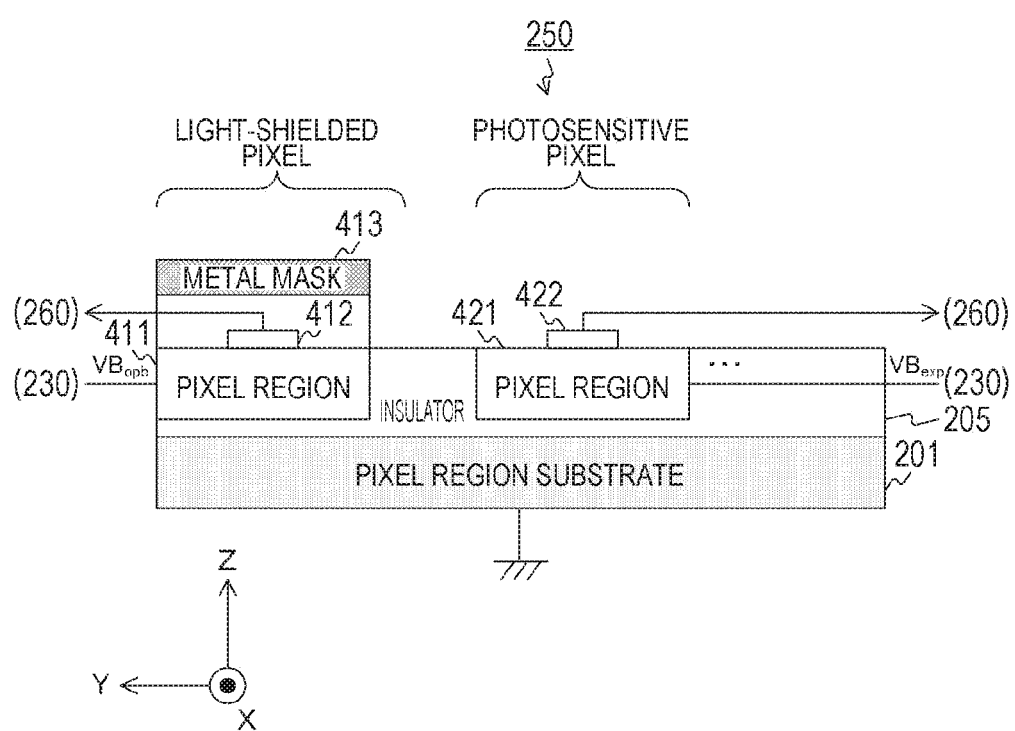
FIG. 20 is an example of a cross-sectional view of the pixel array unit with pixels separated by an insulator according to the second embodiment of the present technology.
Figure 21:
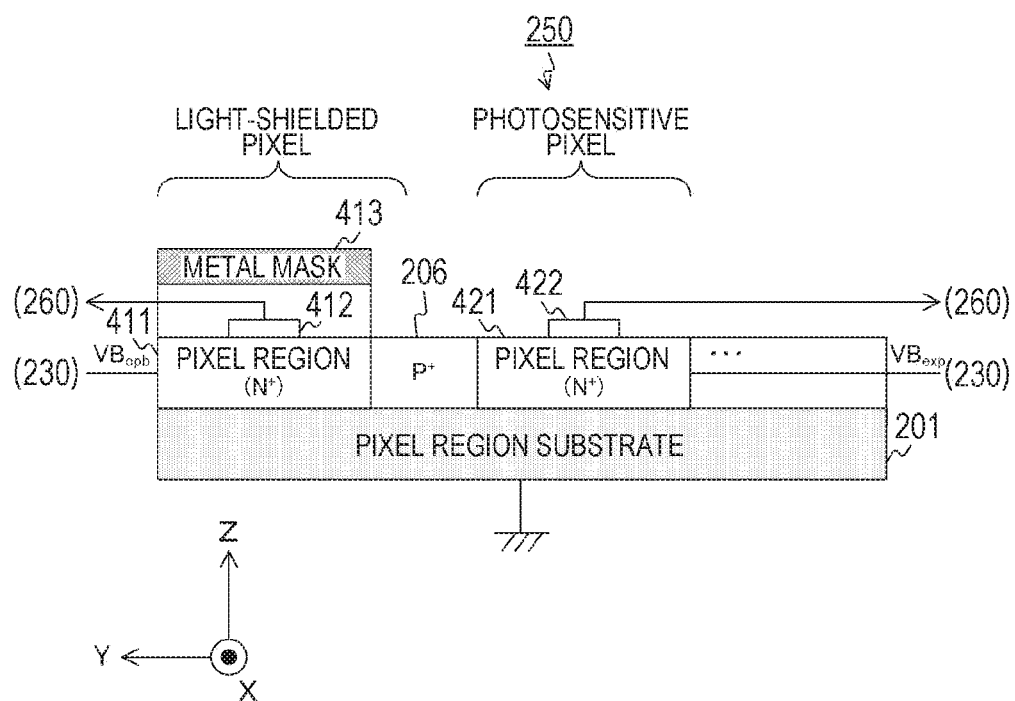
FIG. 21 is an example of a cross-sectional view of the pixel array unit with the pixels separated by a P$^+$ region according to the second embodiment of the present technology.

Note that although the pixels are separated by etching, the present technology is not limited to this configuration. For example, as illustrated in FIG. 20, the pixels can be separated by providing the insulator 205 between the pixels. Alternatively, as illustrated in FIG. 21, the pixels can be separated by providing the pixel region 411 and the like as $N^+$ regions and disposing a $P^+$ region 206 between the pixels.

Figure 22:
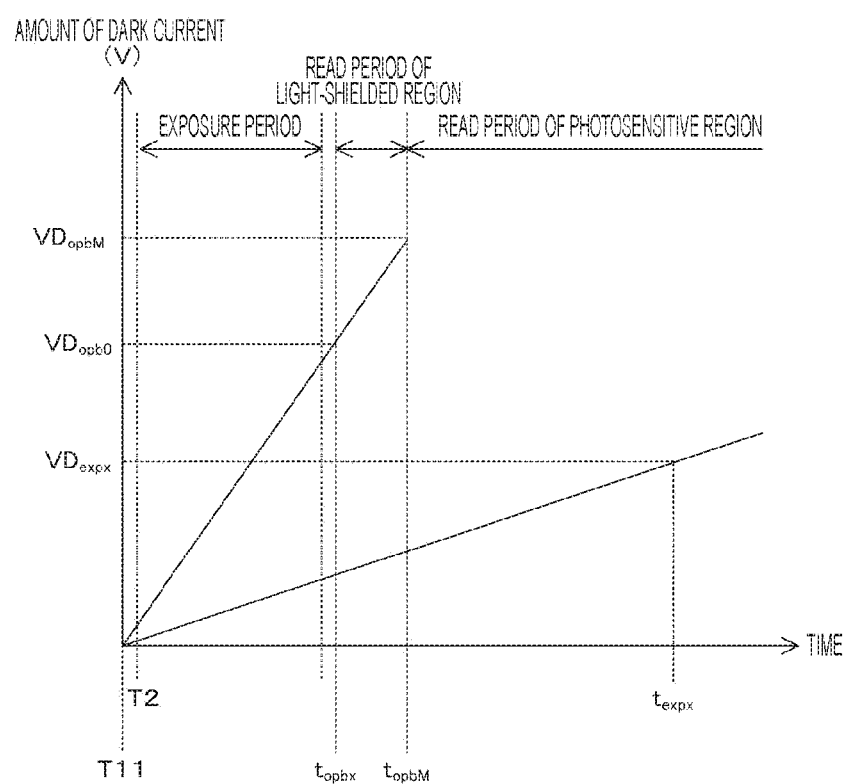
FIG. 22 is an example of a graph illustrating a change in the amount of dark current over time according to the second embodiment of the present technology.

FIG. 22 is an example of a graph illustrating a change in the amount of dark current over time according to the second embodiment of the present technology. In the exposure period and the read periods of the vertical light-shielded region 251 and the photosensitive region 252, the vertical light-shielded region 251 and the photosensitive region 252 are each constantly supplied with a different bias voltage. As a result, the dark current increases at a different rate of increase in each of the vertical light-shielded region 251 and the photosensitive region 252. In the figure, a straight line with the smaller slope represents a change in the amount of the dark current in the photosensitive region 252, and a straight line with the larger slope represents a change in the amount of the dark current in the vertical light-shielded region 251.

Then, the correction coefficient calculation unit 271 first calculates the correction coefficient $s_{opb}$ by using the following expression instead of Expression 1.

$$s_{opb} = VD_{opbM} / t_{opbM}$$

The correction coefficient calculation unit 271 then calculates the correction coefficient $s_{exp}$ using Expression 2. Furthermore, the dark current correction unit 273 determines the amount of dark current $VD_{expx}$ by using the following expression instead of Expression 3.

$$VD_{expx} = s_{exp} \times t_{expx}$$

In the second embodiment of the present technology described above, the bias voltage supply unit 230 continuously supplies the vertical light-shielded region 251 with the bias voltage different from that supplied to the photosensitive region 252, thereby requiring no circuit or element for switching the bias voltage. As a result, the circuit scale of the solid-state image sensor 200 can be reduced.

[Variation]

In the second embodiment described above, the vertical light-shielded region 251 is disposed only on the upper side of the photosensitive region 252, which, however, possibly results in an insufficient number of the light-shielded rows. The solid-state image sensor 200 according to a variation of the second embodiment is different from that of the second embodiment in that the vertical light-shielded region is disposed on each of both upper and lower sides of the photosensitive region.

Figure 23:
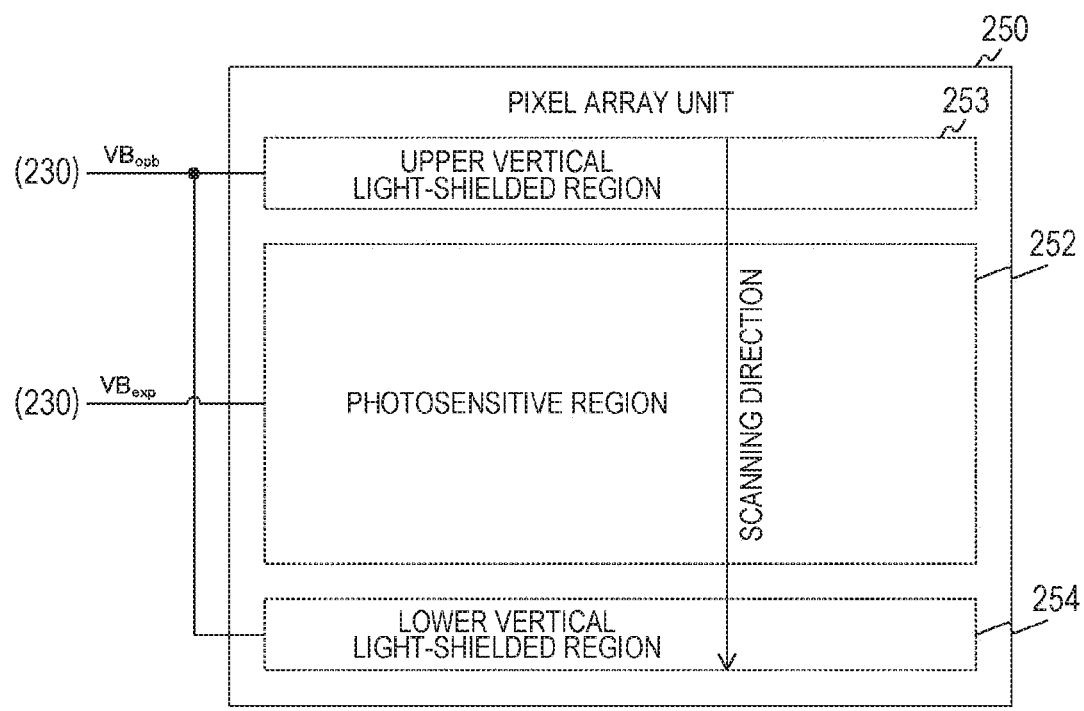
FIG. 23 is an example of a plan view of the pixel array unit according to a variation of the second embodiment of the present technology.

FIG. 23 is an example of a plan view of the pixel array unit 250 according to the variation of the second embodiment of the present technology. The pixel array unit 250 according to the variation of the second embodiment is different from that of the second embodiment in that the upper vertical light-shielded region 253 and the lower vertical light-shielded region 254 are disposed instead of the vertical light-shielded region 251.

Figure 24:
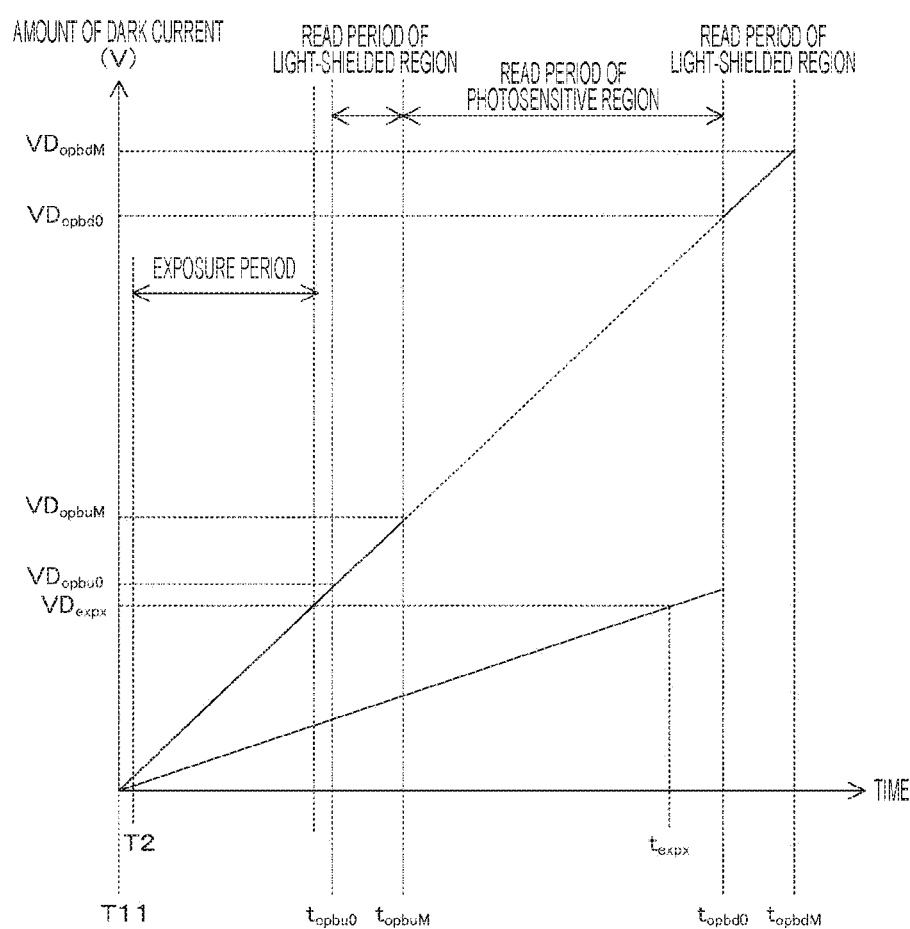
FIG. 24 is an example of a graph illustrating a change in the amount of dark current over time according to the variation of the second embodiment of the present technology.

FIG. 24 is an example of a graph illustrating a change in the amount of dark current over time according to the variation of the second embodiment of the present technology. According to the variation of the second embodiment, in the upper vertical light-shielded region 253 and the lower vertical light-shielded region 254, the dark current increases at the rate of increase different from that in the photosensitive region 252.

Then, the correction coefficient calculation unit 271 first calculates the correction coefficient $s_{opb}$ by using the following expression instead of Expression 1.

$$s_{opb} = \{VD_{opbuM} + (VD_{opbdM} - VD_{opbd0})\}/\{t_{opbuM} + (t_{opbdM} - t_{opbd0})\}$$

Moreover, the correction coefficient $s_{exp}$ and a method of dark current correction in the variation of the second embodiment are similar to those in the second embodiment.

As described above, the variation of the second embodiment of the present technology disposes the light-shielded region not only on the upper side but also on the lower side, thereby being able to increase the number of the light-shielded rows as compared to the case where the light-shielded region is disposed only on the upper side, and improve the accuracy of correcting the dark current.

3. Third Embodiment

In the second embodiment described above, the solid-state image sensor 200 corrects the dark current using only the light-shielded pixel signal from the vertical light-shielded region 251, but the vertical light-shielded region 251 alone cannot achieve sufficient correction accuracy in some cases. The solid-state image sensor 200 according to a variation of the third embodiment is different from that of the second embodiment in that a horizontal light-shielded region is further provided to improve the correction accuracy.

Figure 25:
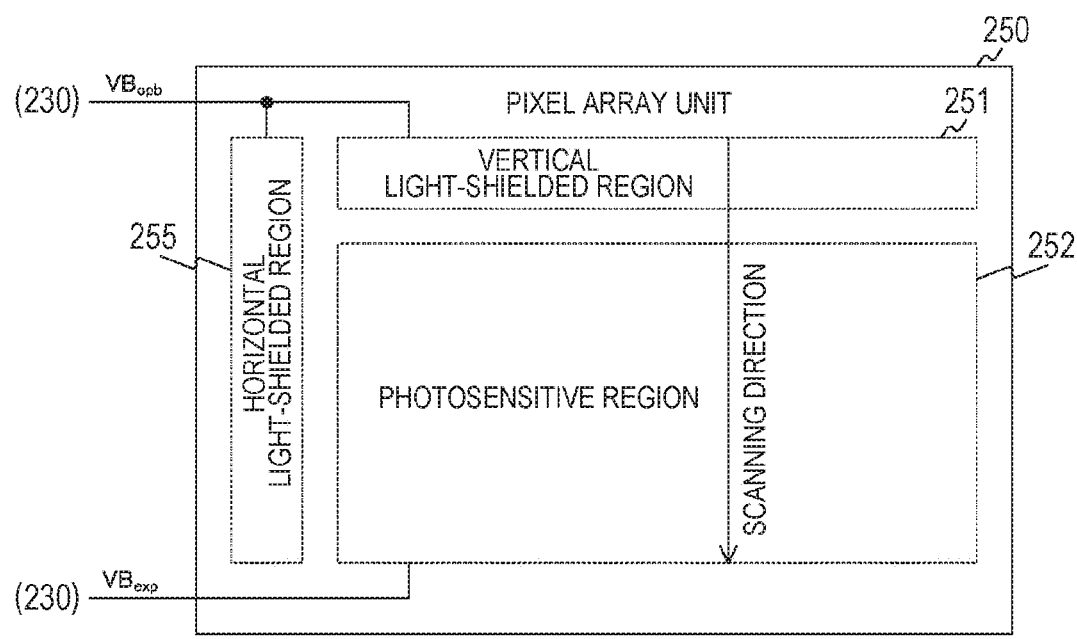
FIG. 25 is an example of a plan view of a pixel array unit according to a third embodiment of the present technology.

FIG. 25 is an example of a plan view of the pixel array unit 250 according to the third embodiment of the present technology. The pixel array unit 250 of the third embodiment is different from that of the second embodiment in that a horizontal light-shielded region 255 is further disposed in addition to the vertical light-shielded region 251.

The horizontal light-shielded region 255 includes an arrangement of the light-shielded pixels 310 having the same row addresses as the photosensitive rows and the light-shielded rows. Also, the number of columns in the horizontal light-shielded region 255 is typically less than that in the vertical light-shielded region 251. Furthermore, the horizontal light-shielded region 255 is supplied with the same bias voltage $VB_{opb}$ as that supplied to the vertical light-shielded region 251.

Figure 26:
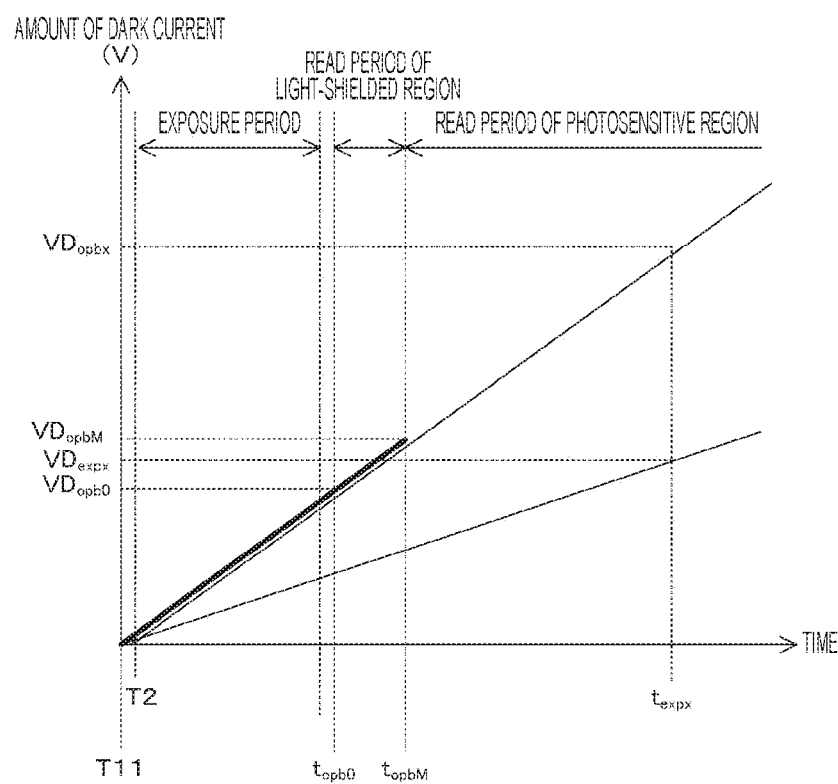
FIG. 26 is an example of a graph illustrating a change in the amount of dark current over time according to the third embodiment of the present technology.

FIG. 26 is an example of a graph illustrating a change in the amount of dark current over time according to the third embodiment of the present technology. In the vertical light-shielded region 251 and the horizontal light-shielded region 255 of the third embodiment, the dark current increases at the rate of increase different from that in the photosensitive region 252. In the figure, a thick solid line with a large slope represents the dark current in the vertical light-shielded region 251, and a thin solid line with a large slope represents the dark current in the horizontal light-shielded region 255.

The signal processing unit 270 of the third embodiment determines an amount of dark current of a photosensitive row to be corrected as $VD_{exphx}$ by calculation similar to that in the second embodiment using the light-shielded pixel signal of the vertical light-shielded region 251. The signal processing unit 270 then acquires, as an amount of dark current $VD_{expvx}$, a statistic (such as an average) of the light-shielded pixel signals of a light-shielded row having the same row address as the photosensitive row to be corrected in the horizontal light-shielded region 255. The signal processing unit 270 calculates, for example, an average of the amounts of dark current $VD_{exphx}$ and $VD_{expvx}$ as the amount of dark current $VD_{expx}$ of that row, and performs dark current correction. Note that the signal processing unit 270 can also calculate, as the amount of dark current $VD_{expx}$, a median of the amount of dark current $VD_{exphx}$ and the individual light-shielded pixel signals of the light-shielded row having the same row address as the correction target.

The third embodiment of the present technology described above further includes the horizontal light-shielded region 255 and further uses the light-shielded pixel signals in that region, thereby being able to improve the correction accuracy as compared with the case where only the vertical light-shielded region 251 is disposed.

<Example of Application to Mobile Body>

The technology according to the present disclosure (the present technology) can be applied to various products. For example, the technology according to the present disclosure may be implemented as a device mounted on a mobile body of any type such as a vehicle, an electric vehicle, a hybrid electric vehicle, a motorcycle, a bicycle, a personal mobility, an airplane, a drone, a ship, or a robot.

Figure 27:
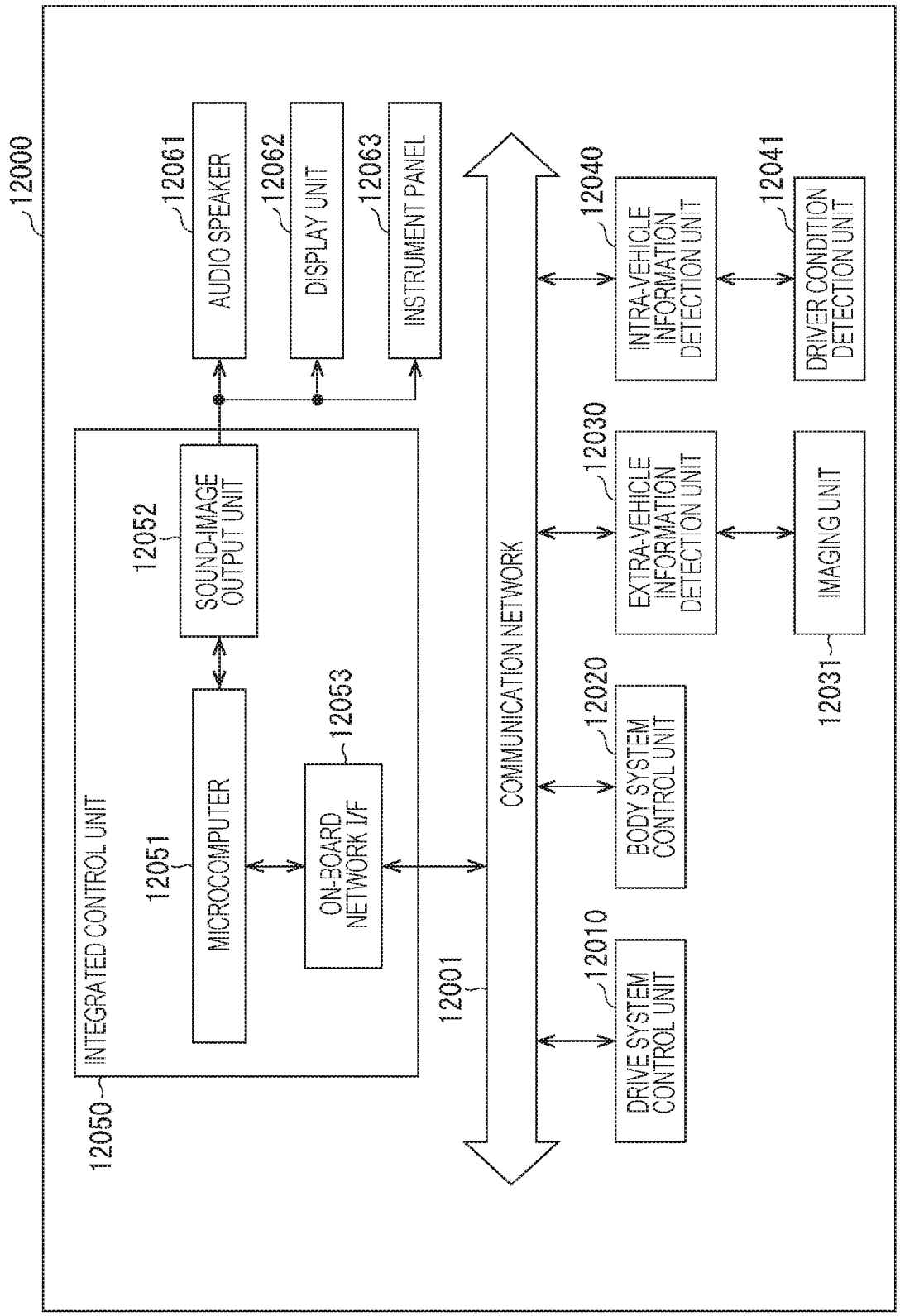
FIG. 27 is a block diagram illustrating an example of a schematic configuration of a vehicle control system.

FIG. 27 is a block diagram illustrating an example of a schematic configuration of a vehicle control system which is an example of a mobile body control system to which the technology according to the present disclosure can be applied.

A vehicle control system 12000 includes a plurality of electronic control units connected via a communication network 12001. In the example illustrated in FIG. 27, the vehicle control system 12000 includes a drive system control unit 12010, a body system control unit 12020, an extra-vehicle information detection unit 12030, an intra-vehicle information detection unit 12040, and an integrated control unit 12050. Moreover, as a functional configuration of the integrated control unit 12050, a microcomputer 12051, a sound-image output unit 12052, and an on-board network interface (I/F) 12053 are illustrated.

The drive system control unit 12010 controls the operation of a device associated with a drive system of a vehicle according to various programs. For example, the drive system control unit 12010 functions as a controller of a driving force generator such as an internal combustion engine or a driving motor for generating the driving force of the vehicle, a driving force transmitting mechanism for transmitting the driving force to the wheels, a steering mechanism for adjusting the steering angle of the vehicle, a braking device for generating the braking force of the vehicle, and the like.

The body system control unit 12020 controls the operation of various devices installed to the vehicle body according to various programs. For example, the body system control unit 12020 functions as a controller of a keyless entry system, a smart key system, a power window device, or various lamps such as a head lamp, a back lamp, a brake lamp, a turn signal, or a fog lamp. In this case, the body system control unit 12020 can receive input of radio waves transmitted from a portable device substituted for a key or signals of various switches. The body system control unit 12020 receives input of these radio waves or signals to control the door lock device, power window device, lamps, or the like of the vehicle.

The extra-vehicle information detection unit 12030 detects information on the outside of the vehicle on which the vehicle control system 12000 is mounted. The extra-vehicle information detection unit 12030 is connected to an imaging unit 12031, for example. The extra-vehicle information detection unit 12030 causes the imaging unit 12031 to capture an image of the outside of the vehicle and receives the image captured. The extra-vehicle information detection unit 12030 may perform object detection processing or distance detection processing for a person, a vehicle, an obstacle, a sign, a character on a road surface, or the like on the basis of the image received.

The imaging unit 12031 is an optical sensor that receives light and outputs an electrical signal corresponding to the amount of light received. The imaging unit 12031 can output the electrical signal as an image or as ranging information. Moreover, the light received by the imaging unit 12031 may be visible light or invisible light such as infrared light.

The intra-vehicle information detection unit 12040 detects information on the inside of the vehicle. The intra-vehicle information detection unit 12040 is connected to a driver condition detection unit 12041 for detecting the condition of a driver, for example. The driver condition detection unit 12041 includes a camera that images the driver, for example, and the intra-vehicle information detection unit 12040 may calculate a degree of fatigue or degree of concentration of the driver or may determine whether or not the driver is dozing off on the basis of the detection information input from the driver condition detection unit 12041.

The microcomputer 12051 calculates a control target value of the driving force generator, the steering mechanism, or the braking device on the basis of the information on the inside or outside of the vehicle acquired by the extra-vehicle information detection unit 12030 or the intra-vehicle information detection unit 12040, thereby being able to output a control command to the drive system control unit 12010. For example, the microcomputer 12051 can perform cooperative control for the purpose of implementing the function of an advanced driver assistance system (ADAS) including collision avoidance or impact mitigation for the vehicle, travel following a vehicle ahead, constant speed travel, or a vehicle collision warning based on the distance between vehicles, a warning for the vehicle going off the lane, or the like.

Moreover, the microcomputer 12051 controls the driving force generator, the steering mechanism, the braking device, or the like on the basis of information on the surroundings of the vehicle acquired by the extra-vehicle information detection unit 12030 or the intra-vehicle information detection unit 12040, thereby being able to perform cooperative control for the purpose of automated driving or the like with which the vehicle travels autonomously without depending on the driver's operation.

Furthermore, the microcomputer 12051 can output a control command to the body system control unit 12020 on the basis of the information on the outside of the vehicle acquired by the extra-vehicle information detection unit 12030. For example, the microcomputer 12051 can perform cooperative control for the purpose of anti-glare such as switching from high beam to low beam by controlling the head lamp depending on the position of a vehicle ahead or an oncoming vehicle detected by the extra-vehicle information detection unit 12030.

The sound-image output unit 12052 transmits an output signal of at least one of sound or image to an output device that can visually or aurally provide notification of information to a passenger of the vehicle or the outside of the vehicle. The example of FIG. 27 illustrates an audio speaker 12061, a display unit 12062, and an instrument panel 12063 as the output devices. The display unit 12062 may include at least one of an on-board display or a head-up display, for example.

Figure 28:
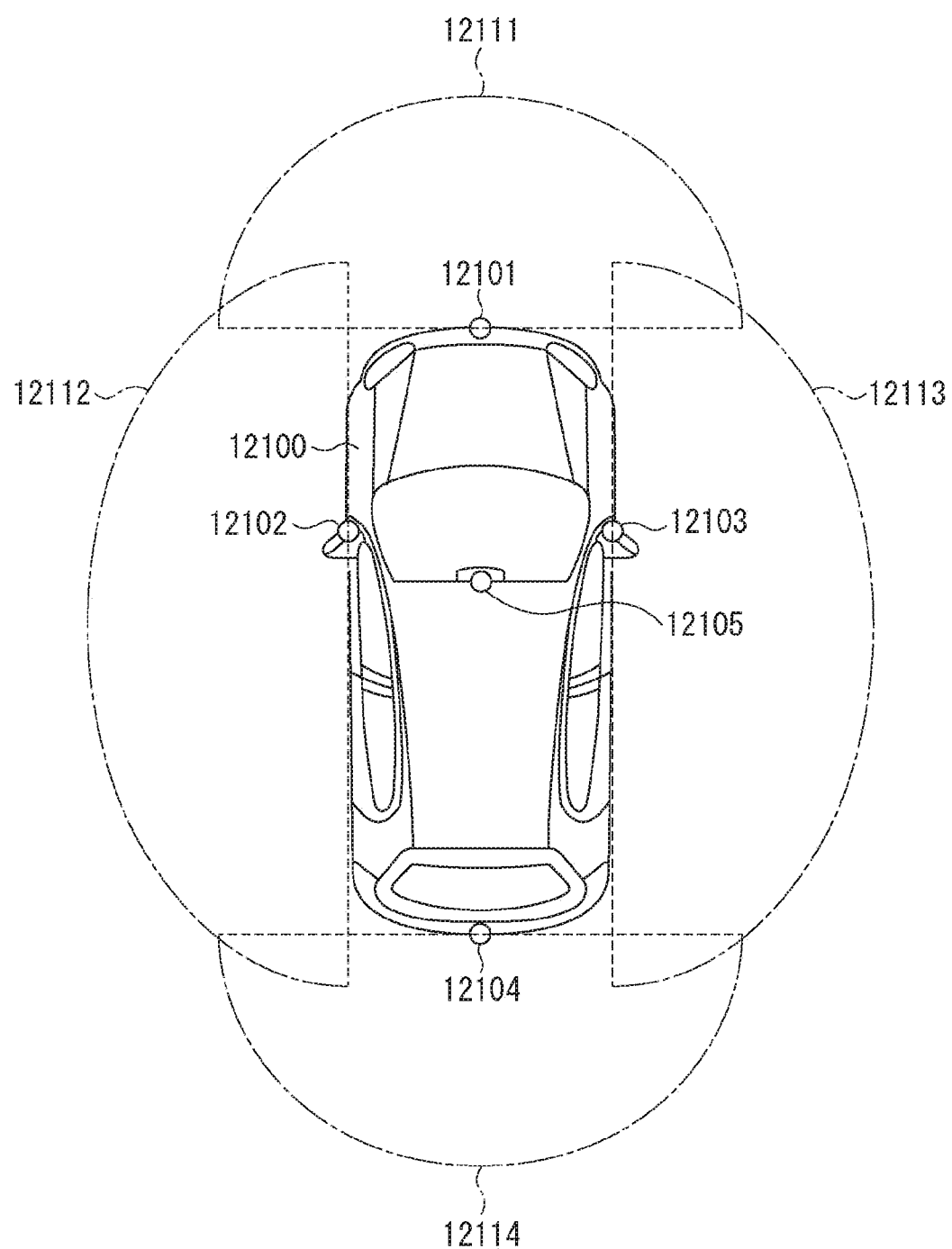
FIG. 28 is an explanatory diagram illustrating an example of an installation position of an imaging unit.

FIG. 28 is a diagram illustrating an example of the installation position of the imaging unit 12031.

In FIG. 28, imaging units 12101, 12102, 12103, 12104, and 12105 are included as the imaging unit 12031.

The imaging units 12101, 12102, 12103, 12104, and 12105 are installed at positions such as a front nose, side mirrors, a rear bumper, a back door, and an upper part of the windshield in the passenger compartment of a vehicle 12100, for example. The imaging unit 12101 installed at the front nose and the imaging unit 12105 installed in the upper part of the windshield in the passenger compartment mainly acquire an image of an area ahead of the vehicle 12100. The imaging units 12102 and 12103 installed on the side mirrors mainly acquire images of areas around the sides of the vehicle 12100. The imaging unit 12104 installed on the rear bumper or the back door mainly acquires an image of an area behind the vehicle 12100. The imaging unit 12105 installed in the upper part of the windshield in the passenger compartment is mainly used for detecting a vehicle ahead or a pedestrian, an obstacle, a traffic light, a traffic sign, a lane, or the like.

Note that FIG. 28 illustrates an example of the imaging range of the imaging units 12101 to 12104. An imaging range 12111 indicates the imaging range of the imaging unit 12101 installed at the front nose, imaging ranges 12112 and 12113 indicate the imaging ranges of the corresponding imaging units 12102 and 12103 installed on the side mirrors, and an imaging range 12114 indicates the imaging range of the imaging unit 12104 installed on the rear bumper or the back door. For example, a bird's eye view image of the vehicle 12100 viewed from above is obtained by superimposing image data captured by the imaging units 12101 to 12104.

At least one of the imaging units 12101 to 12104 may have a function of acquiring distance information. For example, at least one of the imaging units 12101 to 12104 may be a stereo camera including a plurality of imaging elements, or may be an imaging element having pixels for phase difference detection.

For example, on the basis of the distance information obtained from at least one of the imaging units 12101 to 12104, the microcomputer 12051 finds the distance to each three-dimensional object in at least one of the imaging ranges 12111 to 12114 and a temporal change in the distance (relative speed with respect to the vehicle 12100), thereby being able to particularly extract, as a vehicle ahead, a three-dimensional object closest on the path of travel of the vehicle 12100 and traveling at a predetermined speed (for example, 0 km/h or faster) in substantially the same direction as that of the vehicle 12100. Moreover, the microcomputer 12051 can set in advance the distance between vehicles to be secured behind a vehicle ahead, thereby being able to perform automatic brake control (including follow-up stop control), automatic acceleration control (including follow-up start control), and the like. The microcomputer can thus perform the cooperative control for the purpose of automated driving or the like with which the vehicle travels autonomously without depending on the driver's operation.

For example, on the basis of the distance information obtained from at least one of the imaging units 12101 to 12104, the microcomputer 12051 can classify three-dimensional object data associated with a three-dimensional object into a two-wheeled vehicle, a standard sized vehicle, a large sized vehicle, a pedestrian, and other three-dimensional objects such as a utility pole, and extract the data for use in automatic obstacle avoidance. For example, the microcomputer 12051 identifies an obstacle in the vicinity of the vehicle 12100 as an obstacle that can be visually recognized by the driver of the vehicle 12100 or an obstacle that cannot be easily visually recognized by the driver. Then, the microcomputer 12051 determines the risk of collision indicating the degree of risk of collision with each obstacle, and under circumstances where there is a possibility of collision with the risk of collision higher than or equal to a set value, the microcomputer can perform driver assistance to avoid collision by outputting an alarm to the driver via the audio speaker 12061 and/or the display unit 12062 or performing forced deceleration or evasive steering via the drive system control unit 12010.

At least one of the imaging units 12101 to 12104 may be an infrared camera for detecting infrared light. For example, the microcomputer 12051 can recognize a pedestrian by determining whether or not a pedestrian is present in an image captured by at least one of the imaging units 12101 to 12104. Such pedestrian recognition is performed by a procedure of extracting feature points in the image captured by at least one of the imaging units 12101 to 12104 as the infrared camera, for example, and a procedure of performing pattern matching on a series of feature points indicating the outline of an object and determining whether or not the object corresponds to a pedestrian. If the microcomputer 12051 determines that a pedestrian is present in the image captured by at least one of the imaging units 12101 to 12104 and recognizes the pedestrian, the sound-image output unit 12052 controls the display unit 12062 such that a rectangular contour for emphasis is superimposed and displayed on the pedestrian being recognized. The sound-image output unit 12052 may also control the display unit 12062 to display an icon or the like indicating the pedestrian at a desired position.

An example of the vehicle control system to which the technology according to the present disclosure can be applied has been described above. The technology according to the present disclosure can be applied to, for example, the imaging unit 12031 among the configurations described above. Specifically, for example, the solid-state image sensor 200 in FIG. 2 can be applied to the imaging unit 12031. The application of the technology according to the present disclosure to the imaging unit 12031 can remove dark current noise and obtain a clearer captured image, so that fatigue of the driver can be reduced.

Note that the aforementioned embodiments have been described as an example to realize the present technology, where each of the matters described in the embodiments corresponds to each of the matters specifying the invention described in the claims. Likewise, each of the matters specifying the invention in the claims corresponds to each of the matters which are described in the embodiments of the present technology and to which the names identical to those of the matters specifying the invention are assigned. However, the present technology is not limited to the embodiments and can be realized by making various modifications to the embodiments without departing from the scope thereof.

Note that the effect described in the present specification is provided by way of example and not by way of limitation, and there may be another effect.

Note that the present technology can have the following configuration as well.

(1) A solid-state image sensor including:
a bias voltage supply unit that supplies a bias voltage of a predetermined value to a light-shielded pixel impervious to light in a period in which a light-shielded pixel signal is output from the light-shielded pixel, and supplies a bias voltage of a value different from the predetermined value to a photosensitive pixel not impervious to light in a period in which a photosensitive pixel signal is output from the photosensitive pixel; and
a signal processing unit that executes processing of removing dark current noise from the photosensitive pixel signal using the light-shielded pixel signal.

(2) The solid-state image sensor according to (1), in which the bias voltage supply unit supplies the bias voltage of the predetermined value to both the light-shielded pixel and the photosensitive pixel in the period in which the light-shielded pixel signal is output, and supplies the bias voltage different from the predetermined value to both the light-shielded pixel and the photosensitive pixel in the period in which the photosensitive pixel signal is output.

(3) The solid-state image sensor according to (1), in which the bias voltage supply unit supplies the bias voltages different from each other to corresponding ones of the photosensitive pixel and the light-shielded pixel in both the period in which the light-shielded pixel signal is output and the period in which the photosensitive pixel signal is output.

(4) The solid-state image sensor according to (3), further including
an address control unit that sequentially selects a row address assigned to each of a plurality of photosensitive rows each including the photosensitive pixels arranged along a predetermined direction, in which
the light-shielded pixel is arranged in each of a vertical light-shielded region in which a row address different from that of the photosensitive row is assigned and a horizontal light-shielded region in which the row address identical to that of the photosensitive row is assigned.

(5) The solid-state image sensor according to any one of (1) to (4), in which
the signal processing unit simultaneously controls an exposure start timing and an exposure end timing for all of the light-shielded pixel and the photosensitive pixel.

(6) The solid-state image sensor according to any one of (1) to (5), further including
the address control unit that sequentially selects the row address assigned to each of the plurality of photosensitive rows each including the photosensitive pixels arranged along the predetermined direction, in which
the light-shielded pixel is arranged in each of a first vertical light-shielded region in which a row address different from that of the photosensitive row is assigned and a second vertical light-shielded region in which a row address different from that of each of the photosensitive row and the first vertical light-shielded region is assigned.

(7) The solid-state image sensor according to any one of (1) to (6), in which
the light-shielded pixel and the photosensitive pixel are disposed on a predetermined substrate, and
the signal processing unit is disposed on a substrate laminated to the predetermined substrate.

(8) The solid-state image sensor according to any one of (1) to (7), in which
the signal processing unit includes:
a correction coefficient acquisition unit that acquires a correction coefficient representing a rate of increase of the dark current noise on the basis of the bias voltage and the light-shielded pixel signal; and
a dark current correction unit that removes the dark current noise from the photosensitive pixel signal using the correction coefficient.

(9) The solid-state image sensor according to any one of (1) to (8), in which
the light-shielded pixel and the photosensitive pixel each include a photoelectric conversion unit that performs photoelectric conversion.

(10) The solid-state image sensor according to (9), in which
the photoelectric conversion unit is a single element semiconductor device.

(11) The solid-state image sensor according to (9), in which
the photoelectric conversion unit is a compound semiconductor device.

(12) An imaging apparatus including:
a bias voltage supply unit that supplies a bias voltage of a predetermined value to a light-shielded pixel impervious to light in a period in which a light-shielded pixel signal is output from the light-shielded pixel, and supplies a bias voltage of a value different from the predetermined value to a photosensitive pixel not impervious to light in a period in which a photosensitive pixel signal is output from the photosensitive pixel;
a signal processing unit that executes processing of removing dark current noise from the photosensitive pixel signal using the light-shielded pixel signal; and
a storage unit that stores image data including the photosensitive pixel signal from which the dark current noise is removed.

(13) A method of controlling a solid-state image sensor, the method including:
a bias voltage supply procedure that supplies a bias voltage of a predetermined value to a light-shielded pixel impervious to light in a period in which a light-shielded pixel signal is output from the light-shielded pixel, and supplies a bias voltage of a value different from the predetermined value to a photosensitive pixel not impervious to light in a period in which a photosensitive pixel signal is output from the photosensitive pixel; and
a signal processing procedure that executes processing of removing dark current noise from the photosensitive pixel signal using the light-shielded pixel signal.

REFERENCE SIGNS LIST

100 Imaging apparatus
111 Imaging lens
112 Diaphragm
113 Mechanical shutter
120 DSP circuit
130 Display unit
140 Operation unit
150 Bus
160 Frame memory
170 Storage unit
180 Power supply unit
200 Solid-state image sensor
201 Pixel region substrate
202 Control substrate
203 Metal
205 Insulator
206 P$^+$ region
210 Address control unit
220 Timing generation unit
230 Bias voltage supply unit
231 Inverter
232, 233 Dead time control unit
234, 235 Bias voltage source
236, 237 MOSFET
238 Switch
240 Voltage ratio measuring unit
241, 242 ADC
243 Voltage ratio acquisition unit
250 Pixel array unit
251 Vertical light-shielded region
252 Photosensitive region
253 Upper vertical light-shielded region
254 Lower vertical light-shielded region
255 Horizontal light-shielded region
260 Column ADC
270 Signal processing unit
271 Correction coefficient calculation unit
272 Relative time conversion unit
273 Dark current correction unit
274 Signal processing circuit
275 Exposure control unit
301 Load MOS circuit
310 Light-shielded pixel
311, 317 Photoelectric conversion unit
312 Transfer transistor
313 Reset transistor
314 Floating diffusion region
315 Amplification transistor
316 Selection transistor
320 Photosensitive pixel
411 Pixel region
412 Output terminal
413 Metal mask
12031 Imaging unit

The invention claimed is:

1. A solid-state image sensor, comprising:
circuitry configured to:
supply a bias voltage of a first value to a light-shielded pixel in a first period in which a light-shielded pixel signal is output from the light-shielded pixel, wherein the light-shielded pixel is impervious to light;
supply a bias voltage of a second value to a photosensitive pixel in a second period in which a photosensitive pixel signal is output from the photosensitive pixel, wherein
the photosensitive pixel is not impervious to light, and
the bias voltage of the first value is different from the bias voltage of the second value; and
execute a process for removal of dark current noise from the photosensitive pixel signal based on the light-shielded pixel signal.

2. The solid-state image sensor according to claim 1, wherein the circuitry is further configured to:
supply the bias voltage of the first value to each of the light-shielded pixel and the photosensitive pixel in the first period, and
supply the bias voltage of the second value to each of the light-shielded pixel and the photosensitive pixel in the second period.

3. The solid-state image sensor according to claim 1, wherein the circuitry is further configured to:
supply the bias voltage of the first value to the light-shielded pixel in each of the first period and the second period; and
supply the bias voltage of the second value to the photosensitive pixel in each of the first period and the second period.

4. The solid-state image sensor according to claim 3, wherein the circuitry is further configured to sequentially select a first row address assigned to each of a plurality of photosensitive rows, wherein each of the plurality of photosensitive rows includes photosensitive pixels arranged along a specific direction, the light-shielded pixel is arranged in each of a vertical light-shielded region and a horizontal light-shielded region, a second row address different from that of the first row address is assigned to the vertical light-shielded region, and third row address identical to the first row address is assigned to the horizontal light-shielded region.

5. The solid-state image sensor according to claim 1, wherein the circuitry is further configured to simultaneously control an exposure start timing and an exposure end timing for each of the light-shielded pixel and the photosensitive pixel.

6. The solid-state image sensor according to claim 1, wherein the circuitry is further configured to sequentially select that sequentially selects a first row address assigned to each of a plurality of photosensitive rows, wherein each of the plurality of photosensitive rows includes photosensitive pixels arranged along a specific direction, wherein the light-shielded pixel is arranged in each of a first vertical light-shielded region and a second vertical light-shielded region, a second row address different from that of the first row address is assigned to the first vertical light-shielded region, and a third row address different from each of the first row address and the second row address is assigned to the second vertical light-shielded region.

7. The solid-state image sensor according to claim 1, wherein the light-shielded pixel and the photosensitive pixel are on a specific substrate.

8. The solid-state image sensor according to claim 1, wherein the circuitry is further configured to:

acquire, based on the bias voltage of the first value and the light-shielded pixel signal, a correction coefficient representing a rate of increase of the dark current noise; and remove the dark current noise from the photosensitive pixel signal based on the correction coefficient.

9. The solid-state image sensor according to claim 1, wherein each of the light-shielded pixel and the photosensitive pixel includes a semiconductor device that performs photoelectric conversion.

10. The solid-state image sensor according to claim 9, wherein the semiconductor device is a single element semiconductor device.

11. The solid-state image sensor according to claim 9, wherein the semiconductor device is a compound semiconductor device.

12. An imaging apparatus, comprising:

circuitry configured to:

supply a bias voltage of a first value to a light-shielded pixel in a first period in which a light-shielded pixel signal is output from the light-shielded pixel, wherein the light-shielded pixel is impervious to light;

supply a bias voltage of a second value to a photosensitive pixel in a second period in which a photosensitive pixel signal is output from the photosensitive pixel, wherein the photosensitive pixel is not impervious to light, and the bias voltage of the first value is different from the bias voltage of the second value;

execute a process for removal of dark current noise from the photosensitive pixel signal based on the light-shielded pixel signal; and store image data including the photosensitive pixel signal from which the dark current noise is removed.

13. A method of controlling a solid-state image sensor, the method comprising:

supplying a bias voltage of a first value to a light-shielded pixel in a first period in which a light-shielded pixel signal is output from the light-shielded pixel, wherein the light-shielded pixel is impervious to light;

supplying a bias voltage of a second value to a photosensitive pixel in a second period in which a photosensitive pixel signal is output from the photosensitive pixel, wherein the photosensitive pixel is not impervious to light, and the bias voltage of the first value is different from the bias voltage of the second value; and executing a process for removal of dark current noise from the photosensitive pixel signal based on the light-shielded pixel signal.

\* \* \* \* \*